(12) United States Patent
Riley et al.

(10) Patent No.: US 8,787,174 B2
(45) Date of Patent: Jul. 22, 2014

(54) METHODS, SYSTEMS, AND COMPUTER READABLE MEDIA FOR CONDITION-TRIGGERED POLICIES

(75) Inventors: Yusun Kim Riley, Weston, MA (US); Bradley W Gosnell, Mundelein, IL (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 232 days.

(21) Appl. No.: 12/973,228

(22) Filed: Dec. 20, 2010

(65) Prior Publication Data

US 2011/0158090 A1    Jun. 30, 2011

Related U.S. Application Data

(60) Provisional application No. 61/291,494, filed on Dec. 31, 2009, provisional application No. 61/386,476, filed on Sep. 25, 2010, provisional application No. 61/405,630, filed on Oct. 21, 2010, provisional application No. 61/418,803, filed on Dec. 1, 2010.

(51) Int. Cl.
   *H04L 12/26* (2006.01)

(52) U.S. Cl.
   USPC .......................................... 370/237; 370/328

(58) Field of Classification Search
   None
   See application file for complete search history.

(56) References Cited

U.S. PATENT DOCUMENTS

| 7,072,651 | B2 | 7/2006 | Jiang et al. |
| 8,042,148 | B2 | 10/2011 | Andreasen et al. |
| 8,131,831 | B1 | 3/2012 | Hu |
| 2003/0003928 | A1* | 1/2003 | Marjelund et al. ............ 455/464 |
| 2003/0092444 | A1 | 5/2003 | Sengodan et al. |
| 2005/0107091 | A1* | 5/2005 | Vannithamby et al. ....... 455/453 |
| 2005/0122945 | A1 | 6/2005 | Hurtta |
| 2007/0195788 | A1* | 8/2007 | Vasamsetti et al. ...... 370/395.21 |
| 2007/0226775 | A1 | 9/2007 | Andreasen et al. |
| 2007/0242692 | A1 | 10/2007 | Limb et al. |
| 2007/0286117 | A1 | 12/2007 | Balasubramanian et al. |
| 2008/0043689 | A1 | 2/2008 | Walter |
| 2008/0046963 | A1 | 2/2008 | Grayson et al. |
| 2008/0120700 | A1 | 5/2008 | Pandey et al. |
| 2008/0142599 | A1 | 6/2008 | Benillouche et al. |

(Continued)

FOREIGN PATENT DOCUMENTS

| EP | 1 988 680 A1 | 11/2008 |
| EP | 2 093 931 A1 | 8/2009 |

(Continued)

OTHER PUBLICATIONS

Notification of Transmittal of the International Search Report and the Written Opinion of the International Searching Authority, or the Declaration for International Patent Application No. PCT/US2012/036784 (Nov. 1, 2012).

(Continued)

*Primary Examiner* — Ian N Moore
*Assistant Examiner* — Eric P Smith
(74) *Attorney, Agent, or Firm* — Jenkins, Wilson, Taylor & Hunt, P.A.

(57) ABSTRACT

According to one aspect, the subject matter described herein includes a method for determining condition-triggered policies. The method occurs at a Diameter node. The method includes receiving a notification of a network condition. The method further includes determining, based on the network condition, policy information for a plurality of associated subscribers.

27 Claims, 16 Drawing Sheets

(56) References Cited

U.S. PATENT DOCUMENTS

| | | | |
|---|---|---|---|
| 2009/0109845 A1* | 4/2009 | Andreasen et al. | 370/230 |
| 2009/0177650 A1 | 7/2009 | Petersson et al. | |
| 2009/0222538 A1 | 9/2009 | Takahashi et al. | |
| 2009/0225762 A1 | 9/2009 | Davidson et al. | |
| 2009/0227231 A1 | 9/2009 | Hu et al. | |
| 2009/0228956 A1 | 9/2009 | He et al. | |
| 2009/0307028 A1 | 12/2009 | Eldon et al. | |
| 2009/0325574 A1 | 12/2009 | Izawa et al. | |
| 2010/0048161 A1* | 2/2010 | He et al. | 455/404.1 |
| 2010/0080171 A1 | 4/2010 | Rune et al. | |
| 2010/0185488 A1 | 7/2010 | Hogan et al. | |
| 2010/0241496 A1 | 9/2010 | Gupta et al. | |
| 2010/0246500 A1 | 9/2010 | Rydnell et al. | |
| 2010/0290392 A1 | 11/2010 | Rasanen et al. | |
| 2010/0291924 A1 | 11/2010 | Antrim et al. | |
| 2010/0297985 A1 | 11/2010 | Van Erlach | |
| 2011/0022722 A1 | 1/2011 | Castellanos Zamora et al. | |
| 2011/0103261 A1 | 5/2011 | Duan | |
| 2011/0116382 A1 | 5/2011 | McCann et al. | |
| 2011/0167471 A1 | 7/2011 | Riley et al. | |
| 2011/0188457 A1 | 8/2011 | Shu et al. | |
| 2011/0199903 A1* | 8/2011 | Cuervo | 370/235 |
| 2011/0217979 A1 | 9/2011 | Nas | |
| 2011/0296489 A1 | 12/2011 | Fernandez Alonso et al. | |
| 2012/0014332 A1* | 1/2012 | Smith et al. | 370/329 |
| 2012/0028626 A1 | 2/2012 | Marocchi et al. | |
| 2012/0039175 A1 | 2/2012 | Sridhar et al. | |
| 2012/0052866 A1 | 3/2012 | Froehlich et al. | |
| 2012/0084425 A1 | 4/2012 | Riley et al. | |
| 2012/0094685 A1 | 4/2012 | Marsico | |
| 2012/0099529 A1 | 4/2012 | Williams | |
| 2012/0099715 A1 | 4/2012 | Ravishankar et al. | |
| 2012/0100849 A1 | 4/2012 | Marsico | |
| 2012/0236824 A1 | 9/2012 | McCann et al. | |
| 2012/0257499 A1 | 10/2012 | Chatterjee et al. | |
| 2012/0281674 A1 | 11/2012 | Jackson et al. | |

FOREIGN PATENT DOCUMENTS

| | | |
|---|---|---|
| KR | 10-0497290 B1 | 6/2005 |
| WO | WO 2008/147933 A2 | 12/2008 |
| WO | WO 2009/058067 A1 | 5/2009 |
| WO | WO 2009/145785 A1 | 12/2009 |
| WO | WO 2009/149341 A2 | 12/2009 |
| WO | WO 2010/086013 A1 | 8/2010 |
| WO | WO 2010/139360 A1 | 12/2010 |
| WO | WO 2011/082036 A2 | 7/2011 |
| WO | WO 2012/129167 A1 | 9/2012 |
| WO | WO 2012/154674 A2 | 11/2012 |

OTHER PUBLICATIONS

Communication of European Publication Number and Information on the Application of Article 67(3) EPC for European Patent Application No. 10841576.1 (Oct. 10, 2012).

Notification of Transmittal of the International Search Report and the Written Opinion of the International Searching Authority, or the Declaration for International Patent Application No. PCT/US2012/029663 (Aug. 29, 2012).

Commonly-assigned, co-pending U.S. Appl. No. 61/671,691 for "Methods and System for Dynamically Controlling Signaling Costs in a Mobile Network," (Unpublished, filed Jul. 14, 2012).

PCT International Patent Application No. PCT/US2012/036784, Titled, "Methods, Systems, and Computer Readable Media for Steering a Subscriber Between Access Networks," (Unpublished, Filed May 7, 2012).

3rd Generation Partnership Project, "Technical Specification Group Services and System Aspects; Policy and charging control architecture (Release 11)," 3GPP TS 23.203, v11.5.0 (Mar. 2012).

3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).

Third Generation Partnership Project, "Technical Specification Group Core Network and Terminals; Universal Subscriber Identity Module (USIM), Application Toolkit (USAT)," 3GPP TS 31.111, V10.0.0 (Oct. 2010).

Rao, "Mobile Broadband Evolution—LTE and EPC," Motorola General Business, LTE EPC IEEE ComSoC Boston (Apr. 8, 2010).

Third Generation Partnership Project, "Access Network Discovery and Selection Function (ANDSF) Management Object (MO)," 3GPP TS 24.312, V9.1.0 (Mar. 2010).

Third Generation Partnership Project, "Service requirements for the Evolved Packet System (EPS)," 3GPP TS 22.278 V10.1.0 (Mar. 2010).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401, V8.4.1 (Dec. 2008).

Third Generation Pertnership Project, "Technical Specification Group Services and System Aspects; 3GPP System Architecture Evolution: Report on Technical Options and Conclusions," 3GPP TR 23.882, V8.0.0 (September 2008).

Third Generation Pertnership Project 2, "cdma2000 High Rate Packet Data Air Interface; Specification," 3GPP2 C.S0024-A, Version 3.0 (Sep. 2006).

Calhoun et al., "Diameter Base Protocol," RFC 3588, pp. 1-147 (Sep. 2003).

Notificatino of Transmittal of the International Search Report and the Written Opinion of the International Searching Authority, or the Declaration for International Patent Application No. PCT/US2010/061586 (Sep. 26, 2011).

3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).

"Smart Cards; Card Application Toolkit (CAT) (Release 9)," ETSI TS 102 223 V9.2.0, pp. 1-209 (Oct. 2010).

3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).

3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).

3GPP, "Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).

3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).

3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).

Znaty, "Diameter, GPRS, (LTE + ePC = EPS), IMS, PCC and SDM," Effort, pp. 1-229 (Part 1 of 2) (May 2010).

Znaty, "Diameter, GPRS, (LTE + ePC = EPS), IMS, PCC and SDM," EFORT pp. 230-461 (Part 2 of 2) (May 2010).

"Universal Mobile Telecommunications System(UMTS); LTE; Policy and Charging Control over Gx Reference Point (3GPP TS 29.212 version 9.2.0 Release 9)," ETSI TS 129 212 V9.2.0, pp. 1-115 (Apr. 2010).

(56) References Cited

OTHER PUBLICATIONS

3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services ans System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0 pp. 1-102 (Oct. 2008).
International Standard, "Maritime Navigation and Radiocommunication Equipment and Systems—Digital Interfaces—Part 1: Single Talker and Multiple Listeners," IEC 61662-1, Second edition, pp. 1-86 (Jul. 2010).
Non-Final Office Action for U.S. Appl. No. 13/276,916 (Apr. 11, 2013).
Non-Final Office Action for U.S. Appl. No. 13/251,784 (Dec. 19, 2012).
Notice of Allowance and Fee(s) Due for U.S. Appl. No. 12/973,186 (Sep. 19, 2013).
Advisory Action for U.S. Appl. No. 13/251,784 (Sep. 6, 2013).
Notice of Allowance and Fee(s) Due for U.S. Appl. No. 13/276,916 (Sep. 3, 2013).
Non-Final Office Action for U.S. Appl. No. 13/040,020 (Jul. 18, 2013).
Final Office Action for U.S. Appl. No. 13/251,784 (Jun. 26, 2013).
Non-Final Office Action for U.S. Appl. No. 13/157,052 (Jun. 6, 2013).
Final Office Action for U.S. Appl. No. 12/973,186 (May 22, 2013).
"3rd Generation Partnership, Project; Technical Specification Group Core Network and Terminals; Policy and Charging Control over Rx reference point (Release 11)," 3GPP TS 29.214 V11.7.0, pp. 1-53 (Dec. 2012).

Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).
Non-Final Official Action for U.S. Appl. No. 12/973,186 (Aug. 24, 2012).
Notification of Transmittal of the International Search Report and the Written Opinion of the International Searching Authority, or the Declaration for International Patent Application No. PCT/US2010/061589 (Sep. 26, 2011).
Non-Final Office Action for U.S. Appl. No. 13/251,784 (Oct. 10, 2013).
Commonly-assigned, co-pending International Applicaton No. PCT/US13/51447 for "Methods, Systems and Computer Readable Media for Distributing Policy Rules to the Mobile Edge," (Unpublished, filed Jul. 22, 2013).
Commonly-assigned, co-pending U.S. Appl. No. 13/947,314 for "Methods, Systems and Computer Readable Media for Distributing Policy Rules to the Mobile Edge," (Unpublished, filed Jul. 22, 2013).
Commonly-assigned, co-pending International Applicaton No. PCT/US13/50512 for "Methods, Systems, and Computer Readable Media for Dynamically Controlling Congestion in a Radio Access Network," (Unpublished, filed Jul. 15, 2013).
Commonly-assigned, co-pending U.S. Appl. No. 13/942,323 for "Methods, Systems, and Computer Readable Media for Dynamically Controlling Congestion in a Radio Access Network," (Unpublished, filed Jul. 15, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).

* cited by examiner

METHODS, SYSTEMS, AND COMPUTER READABLE MEDIA FOR CONDITION-TRIGGERED POLICIES

PRIORITY CLAIM

This application claims the benefit of U.S. Provisional Patent Application Ser. No. 61/291,494 filed Dec. 31, 2009, U.S. Provisional Patent Application Ser. No. 61/386,476 filed Sep. 25, 2010, U.S. Provisional Patent Application Ser. No. 61/405,630 filed Oct. 21, 2010, U.S. Provisional Patent Application Ser. No. 61/418,803 filed Dec. 1, 2010; the disclosures of which are incorporated herein by reference in their entireties.

TECHNICAL FIELD

The subject matter described herein relates to methods, systems, and computer readable media for communications in a communications network. More particularly, the subject matter described herein relates to methods, systems, and computer readable media for condition-triggered policies.

BACKGROUND

Diameter messages use a per user framework and exist in the format of request-answer messages. Diameter answer messages travel back to the request source via the same path through which the request message was routed using hop-by-hop transport. When one Diameter node needs information from another Diameter node, the first Diameter node sends a request identifying itself and its realm or domain, as well as identifying the realm or domain of the Diameter node from which the first Diameter node needs information. The Diameter answer message sent back from the Diameter node that receives the request will include information identifying the receiving Diameter node and its realm or domain.

One particular use for Diameter protocol is for requesting and receiving a subscriber policy for controlling network access among other things. For example, Diameter messages can be used to request a policy of a subscriber from a node referred to as a policy charging and rules function (PCRF) and to communicate with another node referred to as a policy charging enforcement function (PCEF), which enforces the policy.

In some instances, a policy may change based on particular conditions being met. For example, network or area congestion may trigger the PCEF to request a new policy for a subscriber. If Diameter protocol or another protocol that works per user is used, each subscriber may report congestion to the PCEF, the PCEF may request a policy from the PCRF, and a new policy may be provided from the PCRF to the PCEF for the subscriber. Accordingly, if a condition affects multiple subscribers, a network can experience problems attempting to trigger new policies, such as network overload from policy-related messaging.

Accordingly, in light of these shortcomings, there exists a need for methods, systems, and computer readable media for condition-triggered policies.

SUMMARY

According to one aspect, the subject matter described herein includes a system for determining condition-triggered policies. The system includes a Diameter node. The Diameter node includes a communications interface. The Diameter node also includes a policy selection module for receiving a notification of a network condition and determining, based on the network condition, policy information for a plurality of associated subscribers.

According to another aspect, the subject matter described herein includes a method for determining condition-triggered policies. The method occurs at a Diameter node. The method includes receiving a notification of a network condition. The method also includes determining, based on the network condition, policy information for a plurality of associated subscribers.

According to another aspect, the subject matter described herein includes a method for determining condition-triggered policies. The method occurs at a Diameter node. The method includes receiving a notification of a network condition associated with a first subscriber, determining a plurality of associated subscribers that are being served by a network resource that is also serving the first subscriber, and determining, based on the network condition, policy information for the plurality of associated subscribers.

According to another aspect, the subject matter described herein includes a method for determining condition-triggered policies. The method occurs at a Diameter node. The method includes receiving a notification of a network condition associated with a first network node, determining a plurality of associated subscribers that are being served by the network node, and determining, based on the network condition, policy information for the plurality of associated subscribers.

The subject matter described herein for creating, providing, receiving, and/or using a condition-triggered policy may be implemented in hardware, a combination of hardware and software, firmware, or any combination of hardware, software, and firmware.

In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware in combination with software and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
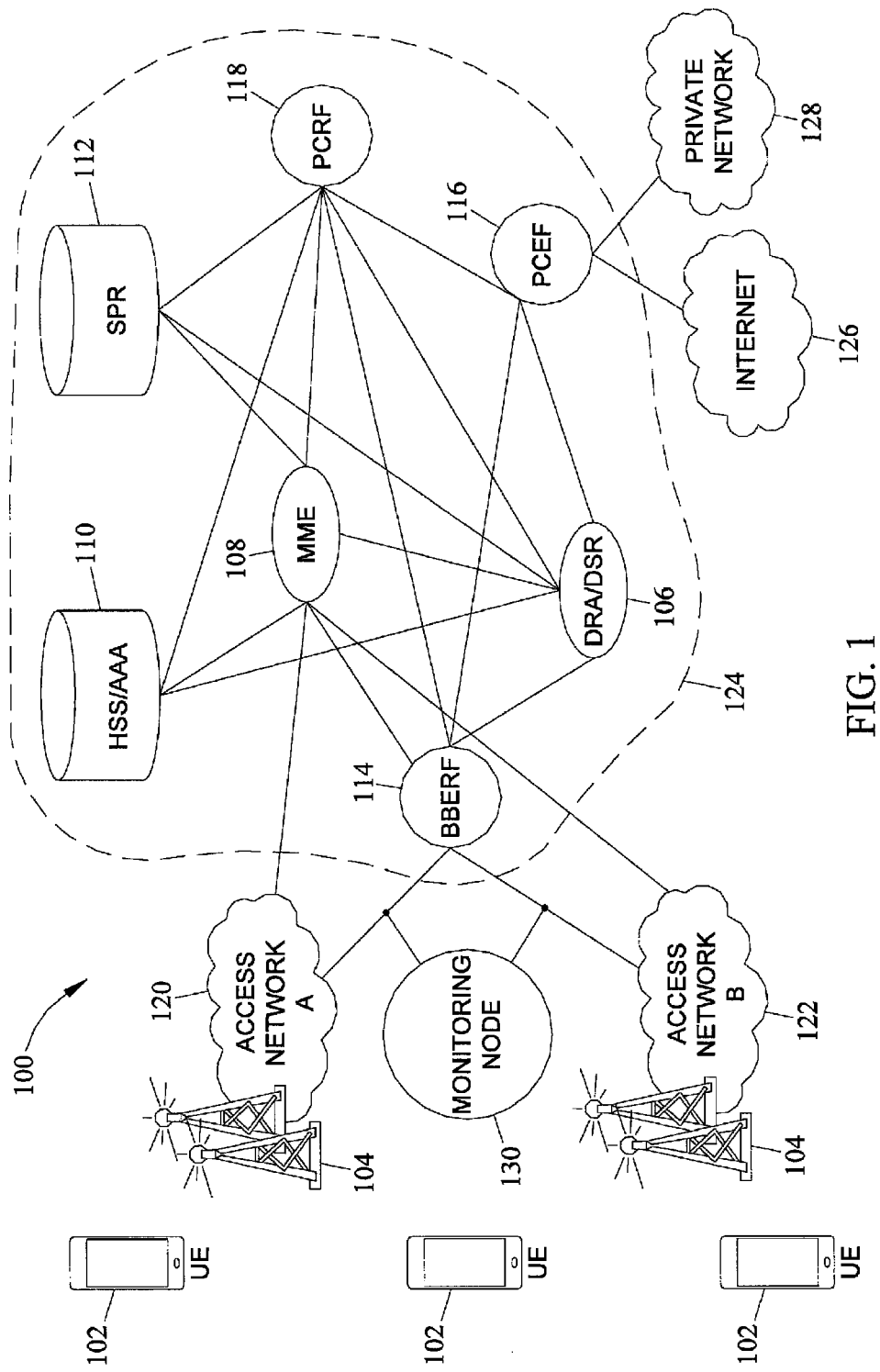
FIG. 1 is a block diagram illustrating an exemplary communications network according to an embodiment of the subject matter described herein.

In accordance with the subject matter disclosed herein, methods, systems, and computer readable media are provided for condition-triggered policies. As stated above, Diameter protocols and similar protocols work per user. For example, messages may be required for each user requesting a service. Accordingly, messaging overhead associated with condition-triggered policies may cause network overload and may hinder the network's ability to efficiently respond to a congestion situation or other condition affecting various users.

In one embodiment of the present subject matter described herein, a PCRF may determine condition-triggered policies for two or more subscribers by using stored information and a condition notification associated with the subscribers. For example, the PCRF may maintain or have access to location information and/or other relevant information about one or more subscribers, e.g., subscriber information may be stored in a local or otherwise accessible database. The PCRF may be notified if a particular condition is met. In one example, the PCRF may subscribe to a cell congestion event for a first subscriber at a node in the network. In another example, a node may report a condition to the PCRF regardless of the condition relating to a subscriber. If the condition is met, a condition notification may be sent to the PCRF. In one embodiment, the PCRF may identify one or more affected or associated subscribers. For instance, using the above example, the PCRF may identify, using stored location information and the condition notification, subscribers or user equipment (UE) affected by the cell congestion event. In another instance, the PCRF may identify subscribers or user equipment (UE) potentially causing the cell congestion event. Using this information, the PCRF may determine appropriate policies for the one or more subscribers and may provide the policies towards appropriate destinations.

In another embodiment of the present subject matter described herein, a PCRF may be adapted to receive notification from various components or nodes in the network, e.g., a core network node, a radio access network, and a network management system node. For example, the notification may indicate that a node in the core network or radio access network is experiencing congestion. This notification may not be related to any specific subscriber, but may be indicative of network-level, node-level and/or application-level congestion. In one embodiment, in response to receiving this notification, the PCRF may be adapted to determine which of its subscribers are associated with the condition notification. For instance, in the above example, the PCRF may determine that one or more subscriber may be using resources associated with the congestion or that one or more subscribers are being served by the network node that is experiencing congestion. In response to determining that one or more subscribers are associated with notification, the PCRF may be adapted to selectively determine policy information (e.g., quality of service (QoS) and policy rules) for some or all of the associated subscribers. In one embodiment, the policy information may be provided to various nodes. For example, policy information may be provided to a PCEF. The policy information may include rules for throttling or blocking traffic associated with a particular subscriber. In another example, policy information may be provided to user equipment (UE). The policy information may include information for triggering the UE to access a core network via a different network (e.g., a non-congested network).

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary communications network 100 according to an embodiment of the subject matter described herein. Referring to FIG. 1, network 100 may include access network A 120, access network B 122, a core network 124, a public network or Internet 126 and a private network 128.

Access network A 120 and access network B 122 may include nodes, functions, devices, and/or components for providing user equipment (UE) 102 access to services, functions, or devices in one or more networks (e.g., core network 124). In one embodiment, access network A 120 and access network B 122 may be a radio access network (RAN) or other access network. For example, network A 120 and network B 122 may include at least one of a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, an evolved HSPA (eHSPA+) network, Access network A 120 and access network B 122 may include one or more transceiver nodes 104 for communicating with UEs 102. UEs 102 represent devices, such as subscriber terminals, for communicating with one or more portions of network 100. For example, UEs 102 may include a computer, a pager, a smartphone, a phone, a wireless modem, a hotspot, a computing platform, a mobile handset, and other subscriber devices.

In the embodiment shown in FIG. 1, UEs 102 may communicate with transceiver nodes 104, which performs radio access functions in access network A 120 and access network B 122. In one embodiment where the access networks are UTRAN networks, a transceiver node 104 may be a node B for communicating with UEs 102. In another example, where the access networks are eUTRAN networks, transceiver node 104 may be an evolved node B (enode B) for communicating with UEs 102.

Access network A 120 and access network B 122 may also include various other modules or nodes, e.g., a radio network controller (RNC), a packet control unit (PCU), a base station controller (BSC), and a gateway (e.g., serving GPRS service node (SGSN)) for communicating with other networks (e.g., a GPRS core network and a 3G/4G network). In one embodiment, access network A 120 and access network B 122 may communicate with core network 124 using gateway functionality at one or more nodes. For example, transceiver node 104 or other node (e.g., a gateway) may communicate UE-related messages (e.g., authentication or mobility related messages) to one or more nodes within the core network 124.

Core network 124 may be a network for providing services to one or more subscribers or UEs 102. For example, core network 124 may perform network aggregation, charging, and authentication functions for UEs 102 connected via access network A 120 or access network B 122. In one embodiment, core network 124 may be at least one of a 3G network, a 3G+ network, a GSM network, a 4G network, an LTE network, an EPC network, a 3rd Generation Partnership Project (3GPP) network, a GPRS core network, or other network.

In the embodiment shown in FIG. 1, core network 124 may include a Diameter relay agent and/or a Diameter signaling router (DRA/DSR) 106, a mobility management entity (MME) 108, a home subscriber server (HSS) and/or authentication, authorization, and accounting (AAA) server (collectively referred to hereinafter as HSS/AAA) 110, a subscriber profile repository 112, a Bearer Binding and Event Reporting Function (BBERF) 114, a policy charging enforcement function (PCEF) 116, a policy charging and rules function (PCRF) 118, and a monitoring node 130.

DRA/DSR 106 may be any suitable entity for routing or relaying Diameter signaling messages routing between Diameter nodes. For example, DRA/DSR 106 may be an LTE signaling router, an LTE Diameter signaling router, a Diameter signaling agent, a Diameter proxy, a Diameter routing agent, or a Diameter redirect agent. DRA/DSR 106 may include functionality for processing various messages. In one embodiment, such functionality may be included in one or more modules (e.g., a firewall module, a network address translation (NAT) module, a subscriber location module, and a routing module).

In one embodiment, DRA/DSR 106 may communicate with MME 108, HSS/AAAs 110, SPR 112, and other nodes via one or more signaling interfaces. For example, DRA/DSR 106 may exchange or communicate messages between MME 108 and HSS/AAAs 110 via one or more LTE S6 interfaces. In a second example, DRA/DSR 106 may exchange or communicate messages between SPR 112 via one or more LTE Sp interfaces.

In another embodiment, DRNDSR 106 may communicate with non-LTE nodes via one or more signaling interfaces. For example, DRA/DSR 106 may communicate with IP multimedia subsystem (IMS) nodes, such as call session control functions (CSCF), using IMS-related interfaces. For instance, DRA/DSR 106 may receive Diameter messages from a CSCF via a Cx Diameter interface. Further description regarding DRA/DSR 106 may be found in commonly assigned, co-pending U.S. patent application Ser. No. 12/906,816 filed Oct. 10, 2010 and in commonly assigned U.S. Provisional Patent Application Ser. No. 61/304,310, the disclosures of which are incorporated herein by reference in their entireties.

MME 108 may be any suitable entity for tracking UE 102. In one embodiment, MME 108 may communicate information (e.g., mobility-related information) to other nodes in network 100. For example, MME 108 may receive registration requests from transceiver node 104 and may communicate with an FIR database for determining whether UE 102 is blacklisted (e.g., banned or stolen device) or whitelisted (e.g., allowed device, emergency device, etc.). Additionally, MME 108 may communicate with various other nodes, e.g., HSS/AAAs 110 for performing authentication or other purposes. In one embodiment, MME 108 may include a serving gateway (e.g., a SGSN) for communicating with access networks (e.g., access network A 120 and access network B 122).

HSS/AAAs 110 represent HSSs and/or AAA servers. In one embodiment, HSS/AAAs 110 may include HSS functionality. For example, HSS/AAAs 110 may maintain subscriber related information, such as user identification, control information for user authentication and authorization, location information, and user profile data. In one embodiment, an HSS/AAAs 110 may also include AAA functionality. For example, HSS/AAAs 110 may perform authentication, authorization, and accounting functions associated with the subscriber. In another embodiment, AAA functionality may be performed by or performed at a node separate or independent from an HSS.

SPR 112 may be any suitable entity for storing or maintaining subscriber related information, such as subscriber profiles. For example, SPR 112 may store user-related information and/or subscriber profiles for use by PCRF 118. In one embodiment, a subscriber profile may include authorization information, charging information, subscription information (e.g., access or service tiers), and quality of service (QoS) information associated with a subscriber, UE 102, and/or a session. For example, a subscriber profile may include QoS information, subscriber preferences, and charging information for different types of session and/or based on UE 102 being used. SPR 112 may communicate with various nodes, e.g., HSS/AAA 110, MME 108, and DRA/DSR 106. For example, SPR 112 may provide or receive subscriber related information associated with a UE 102 during an authentication or registration procedure.

In one embodiment, SPR 112 may be located externally of PCRF 118. In another embodiment, SPR 112 may be co-located or integrated with PCRF 118, HSS/AAA 110, or another node.

BBERF 114 may be any suitable entity for performing bearer binding and/or event reporting. For example, BBERF 114 may be functionality located at a serving gateway, SSGN, or other node. In one embodiment, BBERF 114 may control user plane traffic. For example, BBERF 114 may ensure that a service data flow is carried over a bearer path with an appropriate quality of service and may perform resource reservation. BBERF 114 may also provide event reporting to one or more nodes in network 100. For example, BBERF 114 may inform PCRF 118 of condition events, e.g., based on event triggers installed or requested by PCRF 118. For instance, BBERF 114 may report to PCRF 118 if the status of a related service data flow changes or a congestion event occurs. In one embodiment, BBERF 114 may include PCEF 116 or vice versa.

PCEF 116 may be any suitable entity for enforcing policies. For example, PCEF 114 may be functionality located at a PDN gateway or other node for communicating between networks, e.g., Internet 126 or private network 128. In one embodiment, PCEF 116 manages and enforces policy and charging control (PCC) rules provided by PCRF 118. For example, rules may be provided for each data service flow and/or UE 102 attempting to use PCEF 116. In this example, PCEF 116 may control access to external networks and charge for such access based on rules received from PCEF 116.

In another embodiment, PCEF 116 may include a gateway GPRS support node (GGSN) for communicating between a GPRS network and external networks, e.g., Internet 126 or private network 128. For example, in an embodiment where core network 124 includes a GPRS core network, PCEF 116 may include a GGSN. PCEF 116 may communicate with SGSN or other gateway for providing services to UE 102. In this example, PCEF 116 may request PCC rules from PCRF 118. Using the rules, PCEF 116 may control access to external networks and charge for such access based on rules received from PCEF 116.

While FIG. 1 depicts PCEF 116 residing in core network 124, it is appreciated that other PCEFs 116 may exist. Further, PCEFs 116 may exist in various portions of network 100. For example, a PCEF 116 may exist in access network A 120, e.g., as a gateway for communicating with core network 124 or networks. For instance, where access network A 120 includes a CDMA network, PCEF 116 may be a packet data serving node (PDSN) for communicating between access network A 120 and other packet networks.

PCRF 118 may be any suitable entity for creating, selecting, or otherwise determining policies (e.g., one or more PCC rules). For example, PCRF 118 may be functionality located at or performed by a policy module in various nodes in network 100. In one embodiment, PCRF 118 may be a stand-alone node, e.g., a policy server or a MPE. In a second embodiment, PCRF 118 may be co-located or integrated with one or more nodes in network 100, e.g., DRA/DSR 106. In one embodiment, PCRF 118 may provide a policy to PCEF 116 in response to an access request initiated by UE 102. For example, the access request or a related message may be sent to PCRF 118. In response, PCRF 118 may determine a policy for traffic associated with the subscriber and may provide the policy towards an appropriate destination (e.g., a PCEF 116).

In one embodiment, PCRF 118 communicates with one or more nodes in network 100 for gathering subscriber related information. For example, PCRF 118 may communicate with SPR 112 to retrieve subscriber or UE profile information. In another example, PCRF 118 may communicate with a network management system (NMS), e.g., via a simple network management protocol (SNMP) interface. In this example, PCRF 118 may poll or otherwise query the NMS or a related database to receive information, e.g., regarding the state of one or more devices in an access network, core network, or other network.

In one embodiment, a condition, such as network or cell congestion, may be reported to PCRF 118. For example, one or more network nodes (e.g., BBERF 114, DRA/DSR 106, MME 108, a monitoring node 130, an access network node, and/or PCEF 116) may notify PCRF 118 that an area served by a particular cell or other node is congested. In another example, an external system or an operator may trigger a condition or provide condition related information for use by PCRF 118. For example, an operator, e.g., via an XML interface, may indicate a list of cell sites that are congested and need policy-based traffic throttling. In another example, a RAN monitoring system may communicate with PCRF 118 via an SOAP or XML interface. The RAN monitoring system may provide condition information.

In another embodiment, PCRF 118 may keep track of usage associated with a cell site or other access node for determining a congestion threshold. For example, PCRF 118 may determine an aggregate usage value for a particular access node or access area (e.g., cell site 's') over a configurable duration. The aggregate usage value, or a function based on the value, may be used as a threshold. If usage exceeds the threshold, PCRF 118 may determine that the cell site is congested and, as such, may determine policy information accordingly. In this embodiment, by determining congestion based on usage information, congestion notification may be internal. That is, PCRF 118 may receive a condition notification from itself, or a component therein.

Based on the condition notification and other relevant information, PCRF 118 may determine appropriate policies for affected subscribers. In one embodiment, PCRF 118 may provide the appropriate policies to one or more PCEF 116 or other node for enforcing policy decisions. For example, a policy may be used to differentiate service (e.g., QoS and bandwidth requirements) and access (e.g., ability to use a service or network) between sessions, subscribers, UEs 102, service tiers, or other groupings. In one embodiment, policies may include rules that affect UEs 102 in a particular area or that use a particular access node, access point, or network. For example, policies may include rules for throttle traffic associated with a subscriber or UE 102 using a congested cell.

Monitoring node 130 may represent one or more any suitable entity for monitoring conditions in network 100, or portions therein. In one embodiment, monitoring node 130 may include one or more monitoring probe. For example, network 100 may include various monitoring nodes 130 and/or probes that may monitor (e.g., intercept or receive) traffic via any suitable interfaces, such as traffic between access network B 122 and BBERF 114 via the S1-U interface. In one embodiment, monitoring node 130 may include or be part of a NMS, e.g., a simple network management protocol (SNMP) managed system that monitors one or more devices in network 100. Monitoring node 130 may send condition-related information to PCRF 118 and/or may collect the information (e.g., at an SNMP management information base (MIB) or other database).

It will be appreciated that various nodes in network 100 may additionally be connected to other network nodes, such as a multimedia messaging service center (MMSC), or an application function (AF) node to provide additional functions and services to network subscribers.

It will also be appreciated that FIG. 1 is for illustrative purposes and that various nodes and/or functions may be changed, altered, added, or removed. For example, some nodes and/or functions may be combined into a single entity, e.g., SPR 112 and PCRF 118 may be included in a multimedia policy engine (MPE). In a second example, a node and/or function may be located at or implemented by two or more nodes, e.g., functions of HSS/AAA 110 may be distributed among an HSS and an AAA server.

Figure 2A:
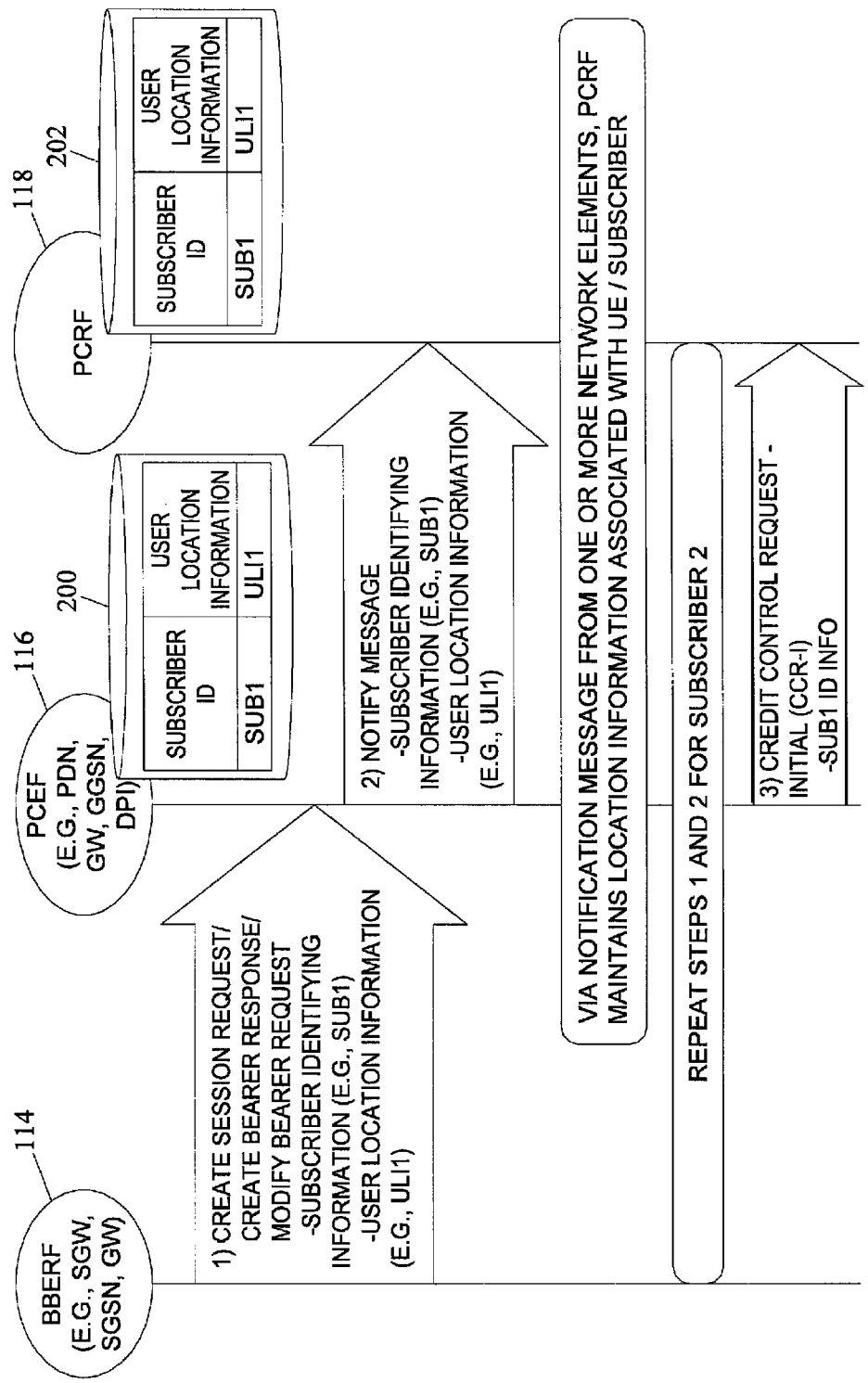
FIG. 2A is a first portion of a message flow diagram illustrating providing policy information based on a congestion condition according to an embodiment of the subject matter described herein.
Figure 2B:
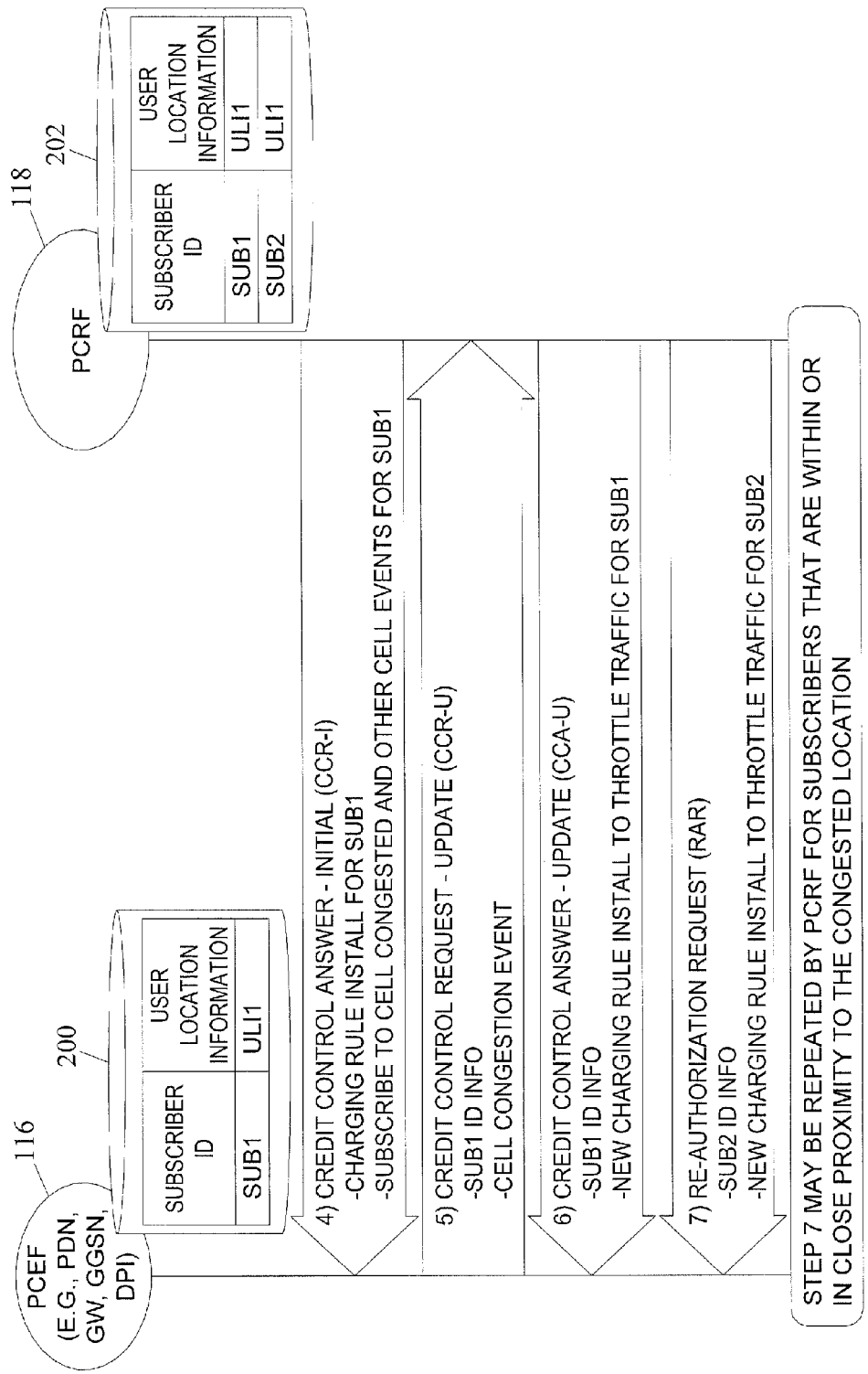
FIG. 2B is a second portion of the message flow diagram illustrating providing policy information based on a congestion condition according to an embodiment of the subject matter described herein.

FIGS. 2A-2B includes a message flow diagram illustrating providing policy information based on a congestion condition according to an embodiment of the subject matter described herein. In the embodiment illustrated in FIGS. 2A-2B, a portion of exemplary network 100 is depicted. In one embodiment, the messages depicted in FIG. 2A-2B may include one or more messages described in 3GPP technical specification (TS) 29.274 V9.3.0 (hereinafter referred to as 3GPP TS 29.274); the disclosure of which is incorporated herein by reference in its entirety. Furthermore, except as disclosed herein, the nodes depicted in FIGS. 2A-2B are essentially the same as described in reference to FIG. 1.

In one embodiment, BBERF 114 may include at least one of serving gateway, gateway, a SGSN, and a node. In one embodiment, PCEF 116 may include at least one of a PDN gateway, GGSN, a deep packet inspection (DPI) node, and a node. In one embodiment, PCEF 116 may include functionality for accessing a database 200. Database 200 may store or maintain subscriber related information. In one embodiment, database 200 may be associated with or include SPR 112. In one embodiment, PCRF 118 may include functionality for accessing a database 202. Database 202 may store or maintain subscriber related information. In one embodiment, database 202 may be associated with or include SPR 112.

Referring to FIG. 2A, at step 1, BBERF 114 may send a message associated with a first subscriber towards PCEF 116. The message may include subscriber identifying information and UE-related location information. For example, the message may be a Create Session Request, a Create Bearer Response, or a Modify Bearer Request. In one instance, BBERF 114 may send a Create Session Request to PCEF 116 via an LTE S5 interface during a packet data protocol (PDP) context activation or IP CAN session activation for UE 102.

In one embodiment, subscriber identifying information may include information for identifying a subscriber or related UE. For example, subscriber identifying information may include at least one of an International Mobile Subscriber Identity (IMSI) value, a mobile subscriber integrated services digital network (MSISDN) number, a short code, a uniform resource identifier (URI), an international mobile equipment identifier (IMEI), a mobile identification number (MIN), and a closed subscriber group (CSG) ID.

In one embodiment, UE-related location information may include information for identifying a location of a UE or associated subscriber. For example, location information may include at least one of a portion of subscriber identifying information (e.g., a mobile country code (MCC) or a mobile network code (MNC) of an IMSI value), a cell global identifier (CGI), a base station identifier (BSID), an access node identifier, a location area code (LAC), a cell identity (CI), a service area code (SAC), a routing area identity (RAI), a routing area code (RAC), a tracking area identity (TAI), an eUTRAN CGI (EGCI), location coordinates (e.g., global positioning system (GPS) information, and relative location information.

In the embodiment shown in FIGS. 2A-2B, PCEF 116 may receive the message from step 1. In one embodiment, PCEF 116 may store subscriber related information, e.g., subscriber identifying information and UE-related location information from the received message. For example, PCEF 116 may store the subscriber related information at database 200.

In the embodiment shown in FIGS. 2A-2B, database 200 is represented as a table. In the table, a first column entitled "SUBSCRIBER ID" may be for storing subscriber identifying information and a second column entitled "USER LOCATION INFORMATION" may be for storing UE-related location information. As depicted, the subscriber identifying information and UE-related location information from the received message may be stored in a first row of database 200. For example, "SUB1" represents subscriber identifying information from the received message and "ULI1" represents UE-related location information from the received message.

At step 2, PCEF 116 may send a notify message including subscriber identifying information and UE-related location information towards PCRF 118. For example, PCEF 116 may send a notification message indicating that UE 102 is roaming in a congested area. In one embodiment, PCEF 116 may also request authentication and/or policy information from PCRF 118.

In the embodiment shown in FIGS. 2A-2B, PCRF 118 may receive the message from step 2. In one embodiment, PCRF 118 may store subscriber identifying information and UE-related location information from the received message. For example, PCRF 118 may store information at database 202. Database 202 may store or maintain information in a similar manner as described in reference to database 200.

While FIG. 2A depicts PCEF 116 providing a notification message to PCRF 118, it will be appreciated that various other nodes may provide notification messages or other messages to PCRF 118. For example, various network nodes, such as BBERF 114, SPR 112, HSS/AAA 110, MME 108, DRA/DSR 106, and transceiver node 104, may provide PCRF 118 with information about subscribers or conditions.

In one embodiment, steps 1 and 2 may be repeated for a second subscriber. For example, a second subscriber may request an IP CAN session. The request may trigger BBERF 114 to send a message associated with the second subscriber towards PCEF 116. The message may include subscriber identifying information and UE-related location information towards PCEF 116. PCEF 116 may receive the message and may store the subscriber related information. PCEF 116 may send a notify message including the subscriber identifying information and the UE-related location information towards PCRF 118. PCRF 118 may receive the notify message and may store the subscriber related information.

In one embodiment, PCEF 116 and PCRF 118 may update or maintain subscriber related information. For example, PCEF 116 and PCRF 118 may update stored information using information received from various network nodes (e.g., UE 102, transceiver node 104, a monitoring probe, BBERF 114 and MME 108).

At step 3, PCEF 116 may send a credit control request (CCR) message associated with the first subscriber towards PCRF 118. For example, PCEF 116 may send a CCR initial (CCR-I) message for indicating IP CAN request associated with the first subscriber and requesting PCC rules for handling sessions associated with the first subscriber. In one embodiment, the CCR message may include subscriber identifying information, e.g., an IMSI value or an MSISDN number associated with UE 102. The CCR message may also include UE-related location information, e.g., a cell or access node identifier associated with UE 102.

In the embodiment shown in FIGS. 2A-2B, PCRF 118 may receive the CCR message from step 3. In one embodiment, PCRF 118 may use subscriber identifying information and UE-related location information stored at a subscriber database (e.g., database 202) and/or another source in determining an appropriate policy. For example, PCRF 118 may retrieve subscriber profile information or other information, such as network conditions, from SPR 112, a network operator, HSS/AAA 110, or other node. Using subscriber related information and/or network information, PCRF 118 may determine an appropriate policy and may provide the policy towards PCEF 116 and/or another destination.

Referring to FIG. 2B, at step 4, PCRF 118 may send a credit control answer (CCA) message including an appropriate policy (e.g., one or more rules) towards PCEF 116. For example, PCRF 118 may send a CCA initial (CCR-I) message towards PCEF 116 indicating that an IP CAN session is allowed. The CCR-I message may also include a policy for traffic associated with the subscriber.

In one embodiment, a CCA message or other message from PCRF 118 may include information for triggering PCEF 116 and/or other nodes to notify PCRF 118 if one or more conditions are met. For example, PCRF 118 may request to be notified about cell congestion and/or other cell events. In one embodiment, PCRF 118 may request notification of a condition affecting a particular subscriber or subscribers.

In another embodiment, PCRF 118 may request notification of a condition without specifying or indicating a subscriber or subscribers. For example, PCRF 118 may indicate to various nodes in network 100 that it is to be notified of a cell congestion event or node failure event regardless of a subscriber being associated or affected by the condition. In this embodiment, PCRF 118 may receive notification of the condition and may determine whether one or more subscribers are associated. In this embodiment, in response to determining one or more subscribers are associated; PCRF 118 may provide appropriate policies.

In yet another embodiment, PCRF 118 may identify subscribers or user equipment (UE) potentially causing a condition. For example, PCRF 118 may examine usage information (e.g., number of active session, amount of bandwidth used, length or time of usage, etc.) of subscribers in a same or similar location or area as the condition, e.g., a same cell site. If usage information indicates a usage anomaly for one or more subscribers (e.g., a high-usage subscriber or "resource hog"), PCRF 118 may provide appropriate policies for throttling traffic associated with the high-usage subscribers.

At step 5, in response to a condition being met, PCEF 116 may send a CCR update (CCR-U) for indicating that a condition has been met and requesting PCC rules. For example, in response to an a cell congestion event, PCEF 116 may send one or more messages to inform PCRF 118 and also to request any additional or updated policy rules based on this condition being met.

In the embodiment shown in FIGS. 2A-2B, PCRF 118 may receive the CCR message including the condition notification from step 5. In one embodiment, PCRF 118 may use the condition notification for determining one or more appropriate policies for subscribers associated with the cell congestion event. For example, in response to receiving a cell congestion notification and/or other information, PCRF 118 may determine associated subscribers.

In one embodiment, associated subscribers may be determined by identifying subscribers associated with the same location information. For example, if a condition notification is related to a particular location (e.g., a cell site 's') and a first subscriber and a second subscriber are located in that particular location as indicated by information in a subscriber database (e.g., database 202), PCRF 118 may identify the first subscriber and the second subscriber as associated with the condition. As such, PCRF 118 may provide or push updated policies to the first subscriber and the second subscriber.

In another embodiment, associated subscribers may be determined using UE-related information and/or service tier or other service level identifiers. For example, in response to a cell congestion notification, PCRF 118 may provide or push updated policies to subscribers that use a congested access node and are of a similar service level (e.g., subscribers of a same service tier).

In some embodiments, associated subscribers may be provided identical or similar policies. For example, in response to a network node failing, PCRF 118 may provide policies such that traffic of all associated subscribers is routed away from the failing node.

In other embodiments, associated subscribers may be provided different policies. For example, in response to a cell congestion notification, PCRF 118 may provide policies based on service levels associated with the affected subscribers. In other words, subscribers of higher service levels may receive greater priority or other beneficial treatment in relation to lower service level subscribers.

In one embodiment, after receiving a cell congestion notification, PCRF 118 may determine all subscribers currently using a congested cell. PCRF 118 may also determine a service level or tier associated with each of the subscribers using the congested cell. Based on the service level information, PCRF 118 may determine different policies for associated subscribers. For example, a policy for an associated lowest tier subscriber may include for rules for throttling traffic severely or block particular traffic completely. While a policy for an associated middle tier subscriber may include rules for throttling traffic moderately and a policy for an associated high tier subscriber may include rules for throttling traffic minimally or may include rules for redirecting or otherwise triggering the subscriber to use another, less congested node.

Referring to FIG. 2B, at step 6, after determining an appropriate policy for the first subscriber, PCRF 118 may send a credit control answer (CCA) message including the appropriate policy towards a PCEF 116 serving the first subscriber. For example, PCRF 118 may send a CCA update (CCR-U) message including a set of rules for handling traffic associated with the first subscriber. PCEF 116 may receive the policy and install, or otherwise implement the policy for the first subscriber.

In the embodiment shown in FIGS. 2A-2B, the condition may include a cell congestion event and the set of rules sent to PCEF 116 may be for throttling traffic associated with the first subscriber.

In one embodiment, PCRF 118 may determine that the second subscriber is associated with the condition. For example, PCRF 118 may inspect database 202 and determine that the first subscriber and the second subscriber have identical or similar UE-related location information (e.g., "ULI1"). In response to determining that the second subscriber is also affected by the condition, PCRF 118 may push or otherwise provide an appropriate policy to PCEF 116 serving for the second subscriber.

At step 7, PCRF 118 may send a Re-Authorization Request (RAR) message including an appropriate policy (e.g., one or more rules) towards PCEF 116. For example, PCRF 118 may send a RAR message towards PCEF 116. The RAR message may include a set of rules for handling traffic associated with the second subscriber. PCEF 116 may receive the policy and install or otherwise implement the policy for the second subscriber.

In the embodiment shown in FIGS. 2A-2B, the condition may include a cell congestion event and the set of rules sent to PCEF 116 may be for throttling traffic associated with the second subscriber.

In one embodiment, step 7 may be repeated by PCRF 118 for each associated subscriber. For example, where a condition notification is related to a congestion area event, PCRF 118 may send a RAR message to other subscribers that are known by PCRF 118 to be within the congested area or in close proximity to the congested area.

In one embodiment, policies may be provided or distributed (e.g., to one or more PCEFs 116) in an order based on various factors. For example, PCRF 118 may send policies based on received notification or subscription information. That is, in one example, PCRF 118 may provide a first policy for a subscriber disclosed in a notify message that triggers the new policy. In this example, PCRF 118 may provide additional policies for other associated subscribers. In another embodiment, policies may be provided or distributed in an order based on PCEF location, PCEF usage, access network, subscriber service level, access time, bandwidth usage, number of active sessions for subscriber, or other factors. In still other embodiment, policies may be distributed or provided randomly or may be preconfigured. For example, a network operator may select a group of subscribers (e.g., subscribers connected via a particular enode B 104) for which updated policy information is to be determined and provided to a PCEF 116.

Figure 3A:
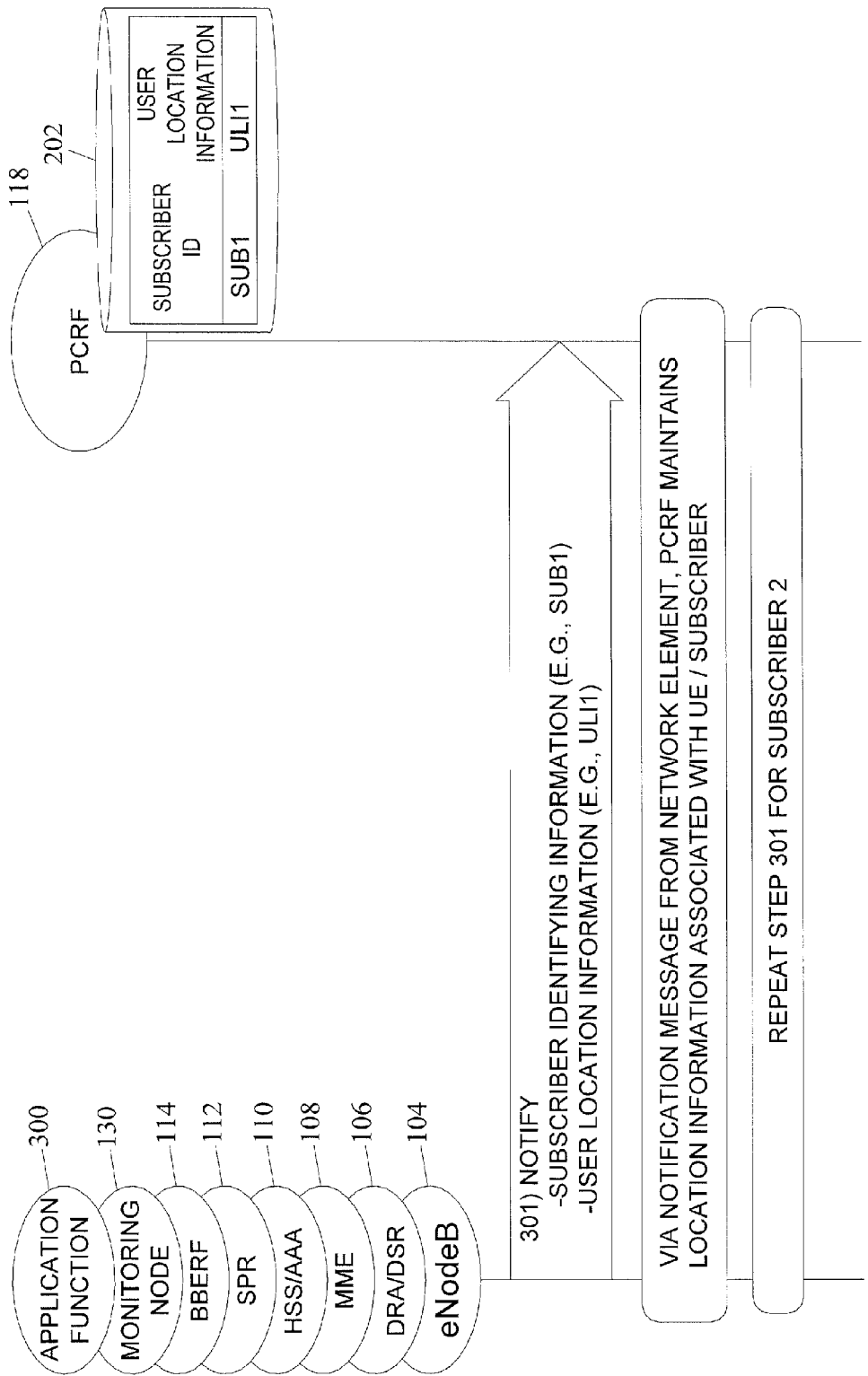
FIG. 3A is a first portion of a message flow diagram illustrating providing policy information based on a congestion condition according to another embodiment of the subject matter described herein.
Figure 3B:
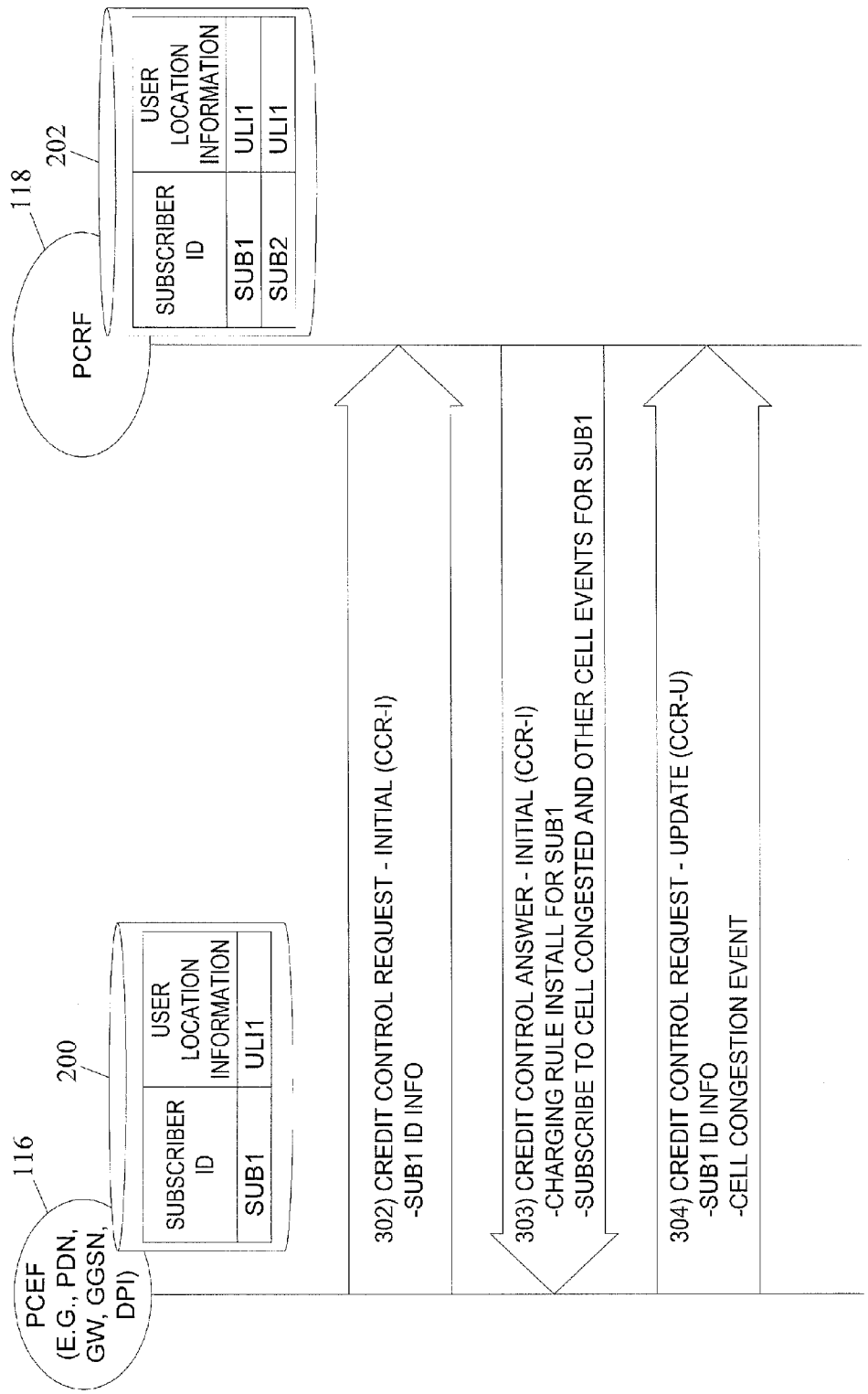
FIG. 3B is a second portion of the message flow diagram illustrating providing policy information based on a congestion condition according to another embodiment of the subject matter described herein.
Figure 3C:
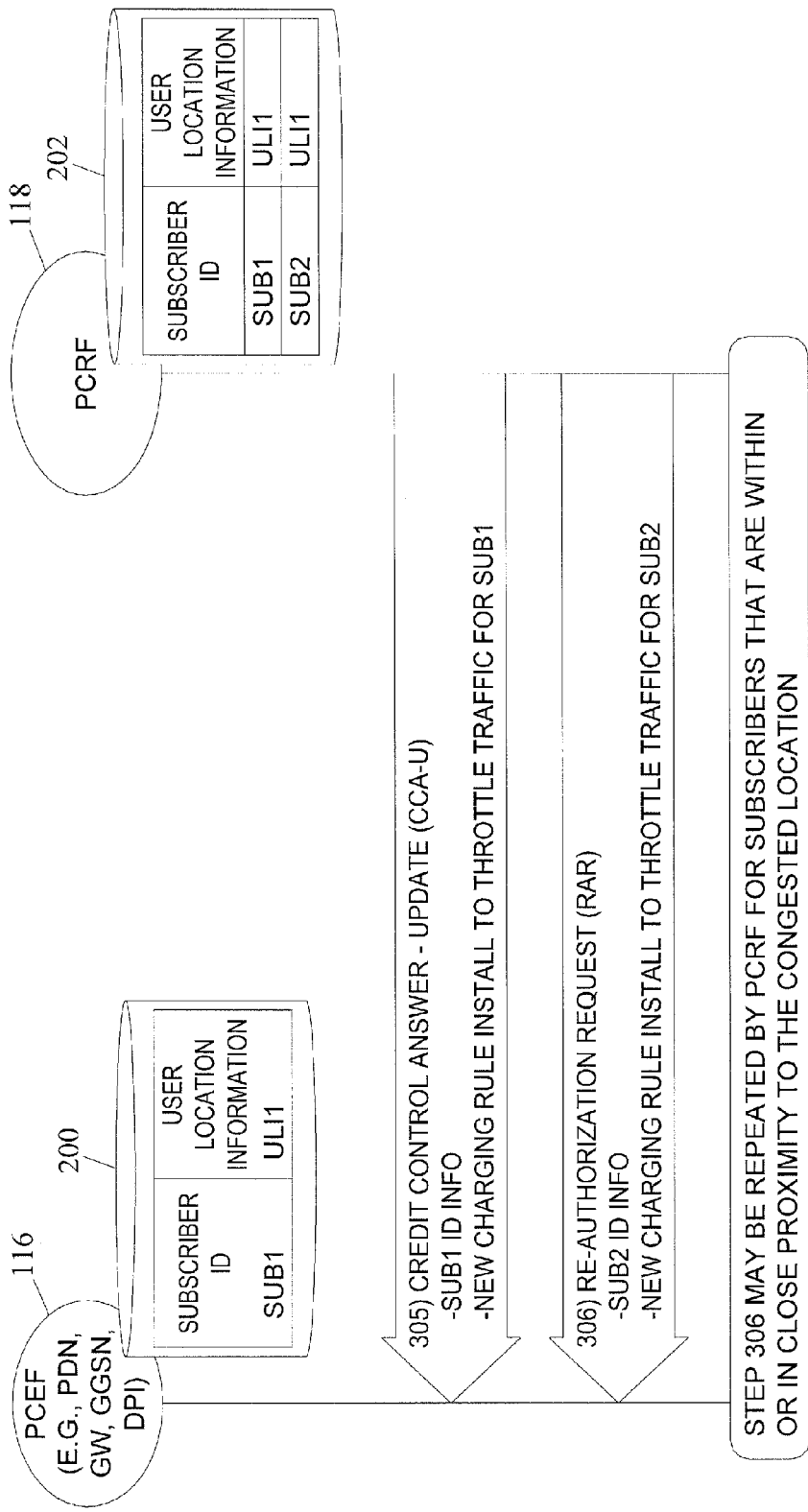
FIG. 3C is a third portion of the message flow diagram illustrating providing policy information based on a congestion condition according to another embodiment of the subject matter described herein.

FIGS. 3A-3C includes a message flow diagram illustrating providing policy information based on a congestion condition according to another embodiment of the subject matter described herein. In the embodiment illustrated in FIGS. 3A-3C, except as disclosed herein, the nodes depicted are essentially the same as described in reference to FIG. 2. In this embodiment, an application function (AF) 300 may be included in network 100.

Referring to FIG. 3A, at step 301, PCRF 118 may receive a notification message or other message for providing information. For example, PCRF 118 may receive a notify message from one or more nodes in network 100, e.g., application function 300, monitoring node 130, PCEF 116, BBERF 114, SPR 112, HSS/AAA 110, MME 108, DRA/DSR 106, and transceiver node 104.

In one embodiment, one or more nodes (e.g., LTE node, core network nodes, network access nodes, or network management nodes) may provide PCRF 118 with UE-related location information and/or other information. Step 301 may be repeated for a second subscriber.

FIG. 3B is a second portion (e.g., steps 302-304) of the message flow diagram of FIG. 3A. FIG. 3C is a third portion (e.g., steps 305-306) of the message flow diagram of FIG. 3A. Steps 302-306 of FIGS. 3B and 3C correspond to and are essentially the same as steps 3-7 of FIGS. 2A and 2B. Therefore, descriptions of the steps will not be repeated herein.

Figure 4A:
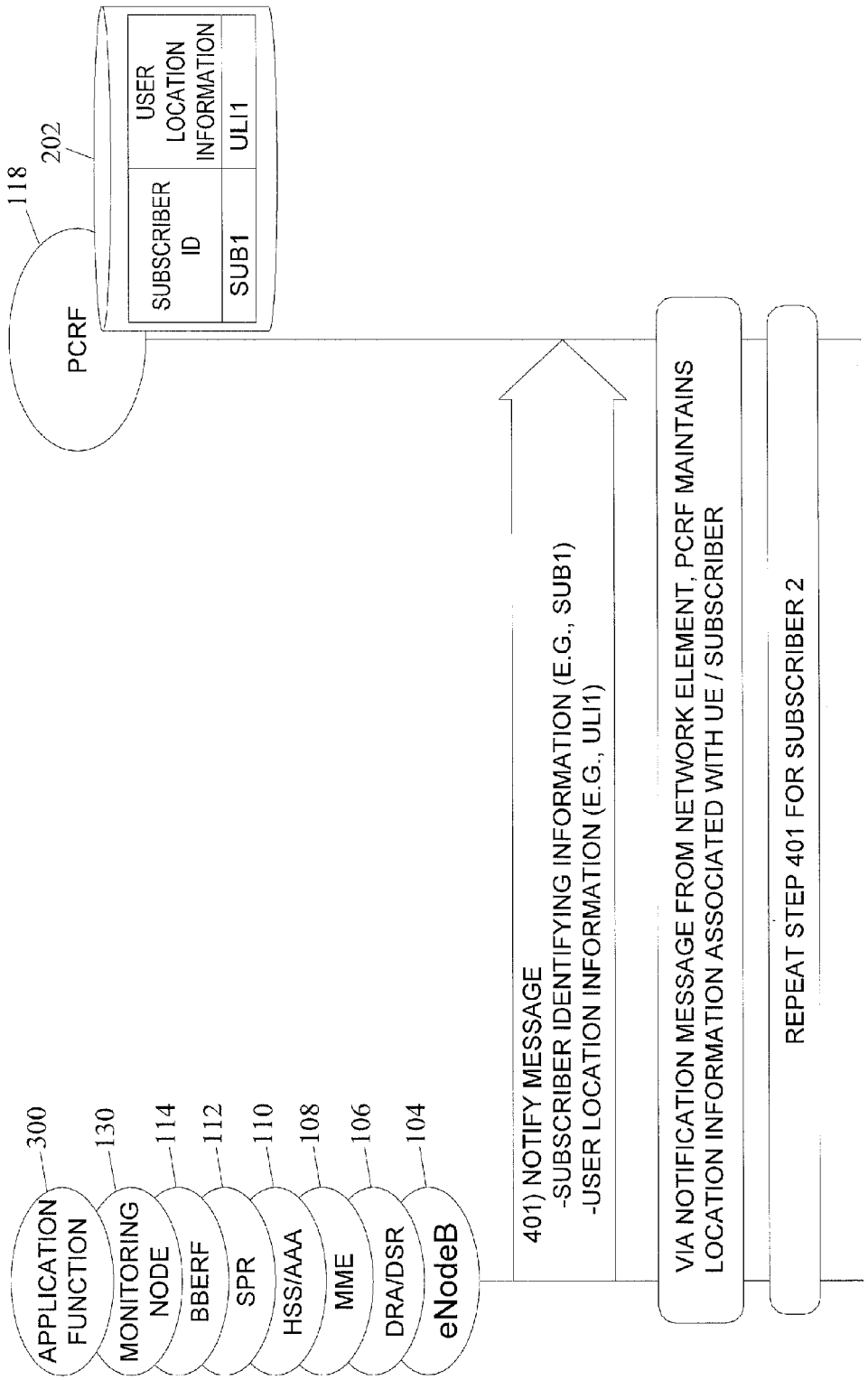
FIG. 4A is a first portion of a message flow diagram illustrating providing policy information based on a congestion condition according to yet another embodiment of the subject matter described herein.
Figure 4B:
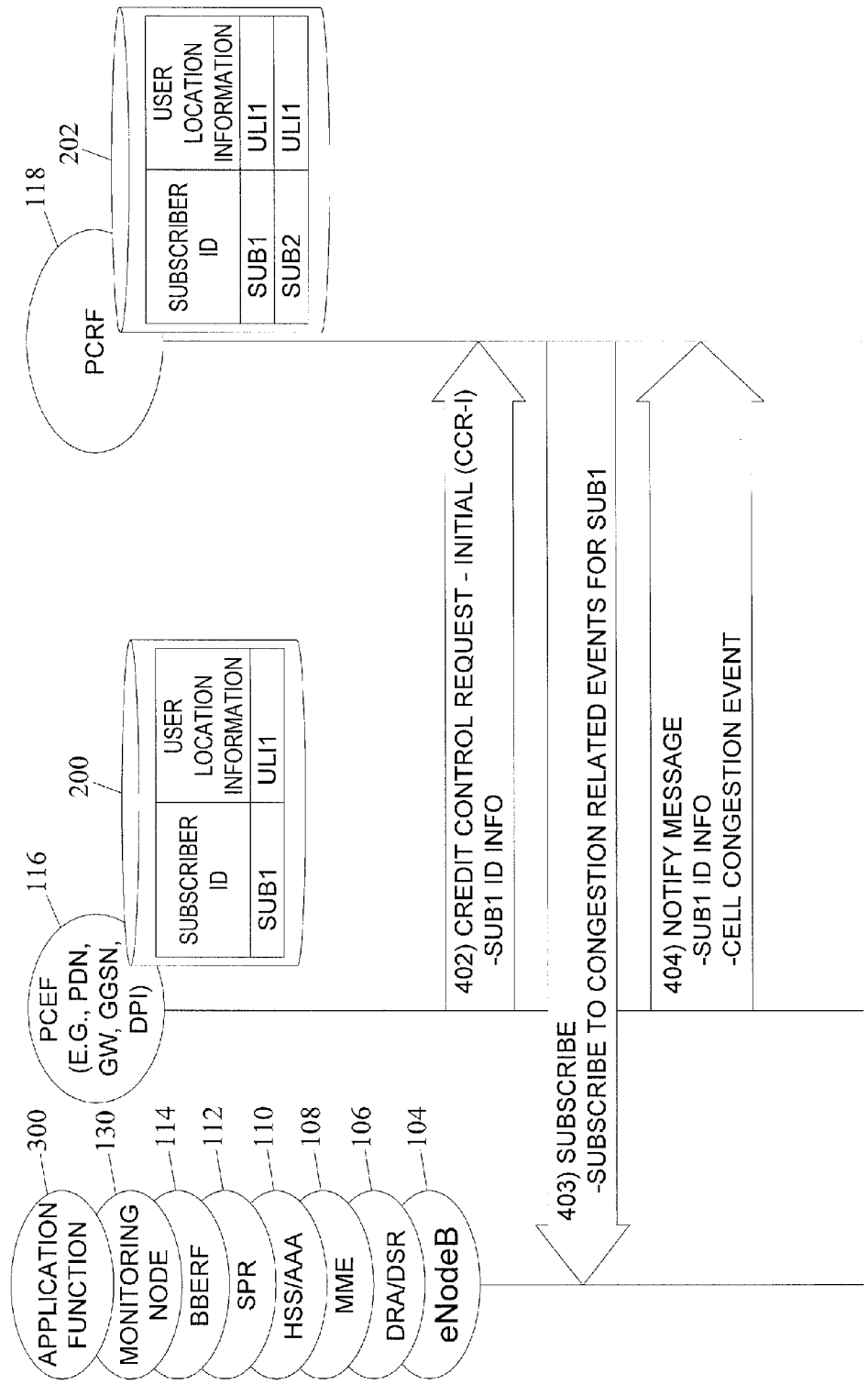
FIG. 4B is a second portion of the message flow diagram illustrating providing policy information based on a congestion condition according to yet another embodiment of the subject matter described herein.
Figure 4C:
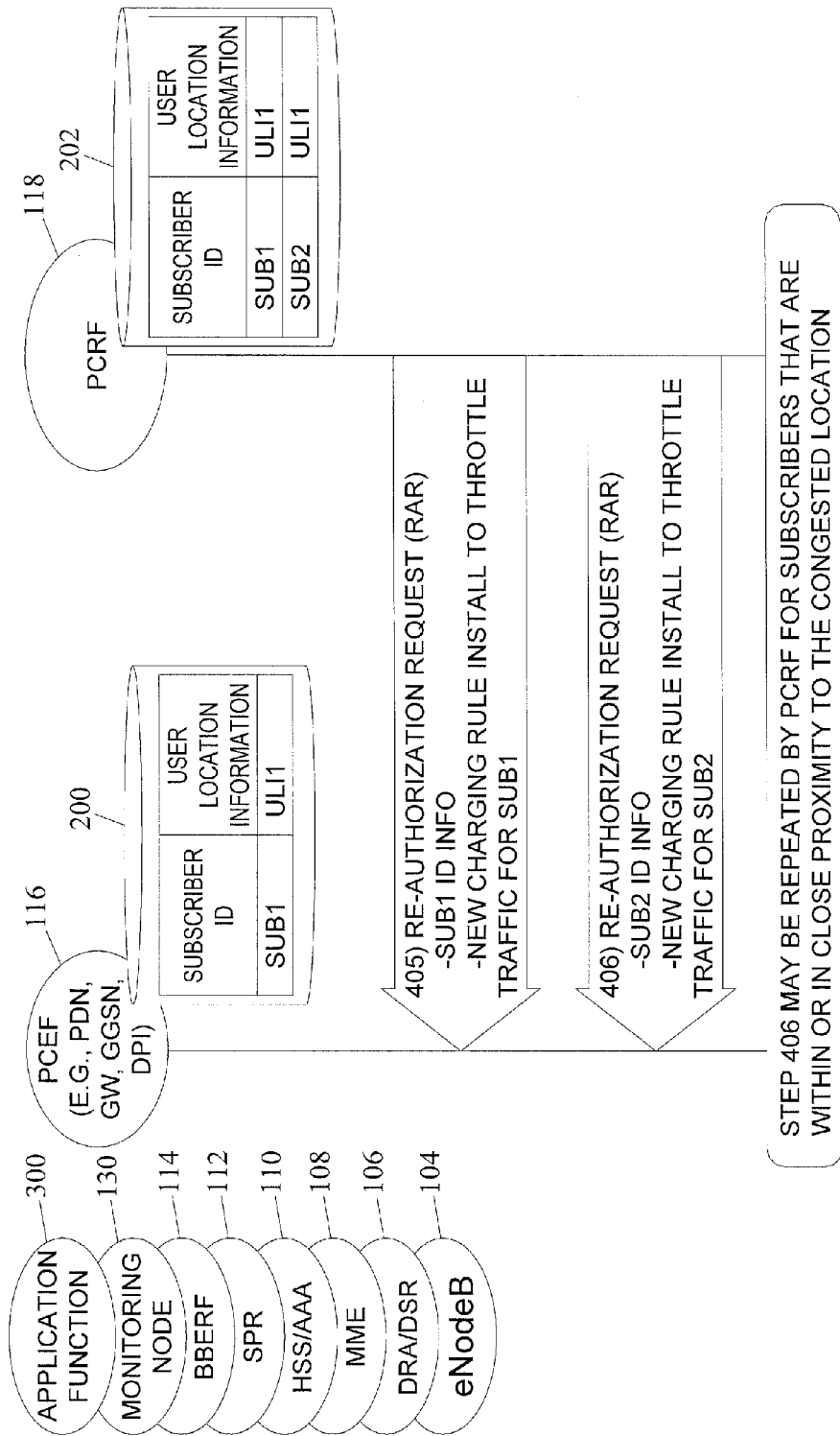
FIG. 4C is a third portion of the message flow diagram illustrating providing policy information based on a congestion condition according to yet another embodiment of the subject matter described herein.

FIGS. 4A-4C includes a message flow diagram illustrating providing policy information based on a congestion condition according to yet another embodiment of the subject matter described herein. In the embodiment illustrated in FIGS. 4A-4C, except as disclosed herein, the nodes depicted are essentially the same as described in reference to FIG. 2.

FIG. 4A, at step 401, PCRF 118 may receive a notification message or other messages for providing information. For example, PCRF 118 may receive a notify message from one or more nodes in network 100, e.g., PCEF 116, BBERF 114, SPR 112, HSS/AAA 110, MME 108, DRA/DSR 106, transceiver node 104, and UE 102.

In one embodiment, one or more nodes (e.g., LTE node, core network nodes, network access nodes, or network management nodes) may provide PCRF 118 with UE-related location information and/or other information. Step 401 may be repeated for a second subscriber.

Referring to FIG. 4B, at step 402, PCEF 116 may send a credit control request (CCR) message associated with the first subscriber towards PCRF 118. For example, PCEF 116 may send a CCR initial (CCR-I) message for indicating an IP CAN session associated with the first subscriber and requesting PCC rules for handling sessions associated with the first subscriber. In one embodiment, the CCR message may include subscriber identifying information, e.g., an IMSI value or an MSISDN number associated with UE 102. The CCR message may also include UE-related location information, e.g., a cell or access node identifier associated with UE 102.

PCRF 118 may receive the CCR message from step 402. In one embodiment, PCRF 118 may use subscriber identifying information and UE-related location information stored at a subscriber database (e.g., database 202) and/or another source in determining an appropriate policy. For example, PCRF 118 may retrieve subscriber profile information or other information, such as network conditions, from SPR 112, a network operator, HSS/AAA 110, or other node. Using subscriber related information and/or network information, PCRF 118 may determine an appropriate policy and may provide the policy towards PCEF 116 and/or another destination.

At step 403, a subscribe message and/or other message may be sent from PCRF 118 towards one or more nodes in network 100. The subscribe message and/or other messages may include information for triggering a node or function to notify PCRF 118 if one or more conditions are met. For example, PCRF 118 may subscribe to cell location change notifications for every session, e.g., via the Gx interface. In another example, PCRF 118 may subscribe to location updates from certain types of users and/or devices, e.g., wireless modems or hotspots. In this example, by subscribing to particular users or devices, the amount of messages between PCEF 116 and PCRF 118 may be minimized. However, this subscription method may still reduce congestion by targeting devices that contribute most heavily towards congestion.

In yet another example, PCRF 118 may request notification of a condition without regard to a subscriber or UE 102. For example, PCRF 118 may request notification of congestion at any nodes (e.g., RAN cell sites) in network 100.

In one embodiment, a condition notification may be sent from at least one of PCEF 116, BBERF 114, SPR 112, HSS/AAA 110, MME 108, DRA/DSR 106, transceiver node 104, and UE 102, a network node, a policy engine, a policy server, an LTE node, a network management node, an IMS network node, a radio access network (RAN) node, a core network node, an external network node, a server, a node, a database, and a computing platform.

At step 404, PCEF 116 or other node (e.g., a subscribed-to node) may send a notify message including subscriber identifying information towards PCRF 118. For example, MME 108 may send a notification message indicating the first subscriber is roaming in a congested area. In one embodiment, the message may include a Diameter or LTE related message. For example, MME 108 may receive a tracking area update (TAU) message. The TAU message may be initiated by a UE 102 when UE 102 detects entering a tracking area that is not previously registered in the MME 108 for use by UE 102. In response to receiving such a message and in response to a condition being met (e.g., the first subscriber entering a congested area), MME 108 may notify PCRF 118.

Referring to FIG. 4C, at step 405, in response to receiving a notify message from one or more nodes, PCRF 118 may send a RAR message including an appropriate policy for the first subscriber towards PCEF 116. The RAR message may include a set of rules for handling traffic associated with the second subscriber. PCEF 116 may receive the policy and implement the policy for the second subscriber.

At step 406, PCRF 118 may send a RAR message including an appropriate policy for the second subscriber towards PCEF 116. The RAR message may include a set of rules for handling traffic associated with the second subscriber. PCEF 116 may receive the policy and implement the policy for the second subscriber.

In one embodiment, step 406 may be repeated by PCRF 118 for each associated subscriber. For example, PCRF 118 may send a RAR message to other subscribers that are known by PCRF 118 to be within a congested area or in close proximity to the congested area.

In an alternative embodiment, where a PCEF 116 is handling traffic for multiple associated subscribers, PCRF 118 may send a RAR message or other message that includes one or more appropriate policies for the multiple associated subscribers. PCEF 116 may receive and may implement the policy for each of the associated subscribers. In this embodiment, message overhead may be further reduced since a RAR message may not be sent for each associated subscriber.

Figure 5:
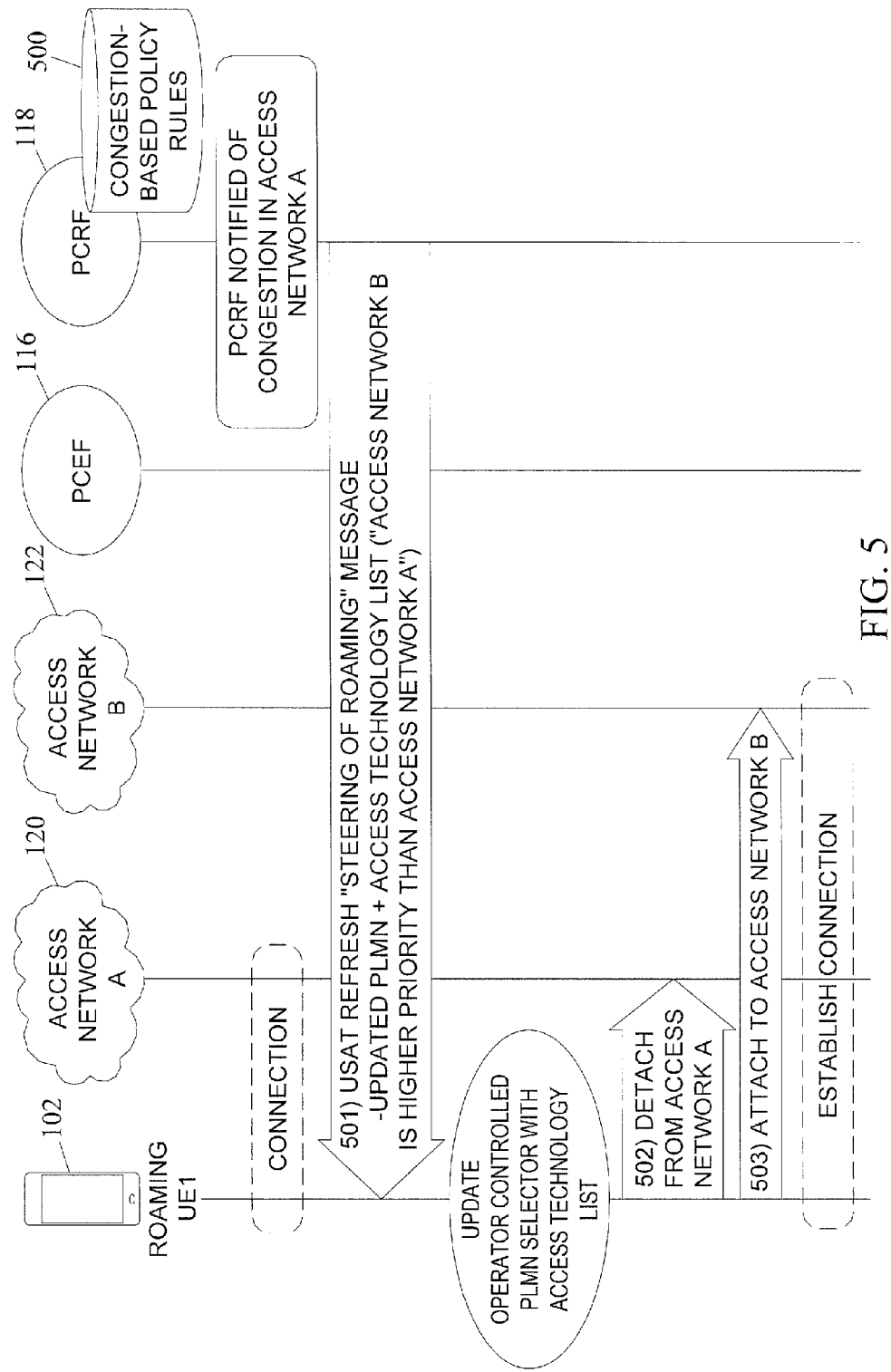
FIG. 5 is a message flow diagram illustrating providing policy information to user equipment according to an embodiment of subject matter described herein.

FIG. 5 is a message flow diagram illustrating providing policy information to user equipment according to an embodiment of subject matter described herein. In the embodiment illustrated in FIG. 5, except as disclosed herein, the nodes depicted are essentially the same as described in reference to FIG. 2.

In this embodiment, a UE 102 may include a universal integrated circuit card (UICC), e.g., a removable chip which may include universal subscriber identification module (USIM) information. In one embodiment, applications implemented on the UICC may use a USIM application toolkit (USAT) which allows the applications to communicate with nodes in network 100 and/or initiate other actions. For example, using USAT or another mechanism, UE 102 or an associated UICC may notify PCRF 118 or other node (e.g., DRA/DSR 106) regarding congestion or other network status event. Further information regarding USAT and UICC functionality is described in 3GPP TS 31.111 V10.0.0 dated October 2010; the disclosure of which is incorporated herein in its entirety.

In one embodiment, PCRF 118 may be a stand-alone node (e.g., a policy server) or may be co-located or integrated with another function and/or node, e.g., a policy module at DRA/DSR 106. PCRF 118 may also include or have access to a policy rule database 500.

Database 500 may be any suitable entity for storing or maintaining policy rules. For example, database 500 may be a stand-alone database node or may be a module co-located or integrated with another function and/or node. In one embodiment, database 500 may include rules associated with condition-triggered policies. For example, database 500 may include rules for throttling traffic associated with particular subscribers and/or sessions in response to a network or cell congestion event. In a second example, database 500 may include rules for throttling traffic for particular subscribers and/or sessions in response to a node failing or becoming inactive.

In one embodiment, PCRF 118 may be notified of a condition being met. For example, PCRF 118 may receive notification from a UE 102 or an application implemented at UE 102 (e.g., a UICC application). The notification may indicate that access network A 120 is currently congested. PCRF 118 may determine using relevant information (e.g., stored UE-related location) that a roaming UE 102 is connected via congested access network A 120. In response to determining that UE 102 is connected via congested access network A 120, PCRF 118 may determine an appropriate policy. For example, PCRF 118 may use information from database 500 and/or other information for determining an appropriate policy.

In one embodiment, PCRF 118 may determine that policy or related information is to be provided towards UE 102 or a portion therein (e.g., a UICC). For example, PCRF 118 may determine that access information stored at a UICC of UE 102 should be updated and may provide information towards UE 102 for updating the access information. In this example, access information may include information for selecting an access network.

Referring to FIG. 5, at step 501, in response to determining that UE 102 is connected via congested access network A 120 and determining that access information stored at UE 102 should be updated, PCRF 118 may send a USAT refresh message including access information towards UE 102. For example, access information may include steering of roaming (SoR) information. In the embodiment shown in FIG. 5, SoR information may include a list of available and/or preferred networks, such as public land mobile networks (PLMNs), and may also include access technology list information for indicating access technology of the networks. As used hereinafter, "PLMN" will be used interchangeable with network.

In one embodiment, SoR information may also indicate priority information. For example, priority information may indicate priority or preference among a plurality of access networks. For instance, as illustrated in FIG. 5, SoR information may indicate that access network B 122 is preferred or has higher priority than access network A 120.

Roaming UE 102 may receive the USAT refresh of step 501. Using access information from the USAT refresh message, UE 102, or a portion thereof (e.g., a UICC), may update access information used for selecting an access network or other network. For example, a UICC of a UE 102 may have memory for storing an operator controlled PLMN selector list and a user controlled PLMN selector list. The lists may contain a list of preferred PLMNs in priority order and may also indicate an access technology (e.g., UTRAN, or GERAN) used by the PLMNs. In this example, the UICC, or an application thereon, may update its operator controlled PLMN selector list using information from the USAT refresh message.

In one embodiment, the updated list may indicate a new priority order among PLMNs, e.g., access network A 120 is no longer the highest priority access network. In response to receiving access information indicating a new priority order among PLMNs, UE 102 or associated UICC application may initiate a new PLMN selection for connecting to a higher priority network (e.g., access network B 122).

At step 502, in response to access information indicating a network of a higher priority than network access A 120, UE 102 or associated UICC application may initiate a detach request for disconnecting or de-registering from access network A 120.

At step 503, UE 102 or associated UICC application may initiate an attach request for registering or establishing a connection with higher priority network, e.g., access network B 122. For example, after a detach message has been acknowledged from access network A 120, UE 102 may send an attach request for establishing a connection with access network B 122.

Figure 6:
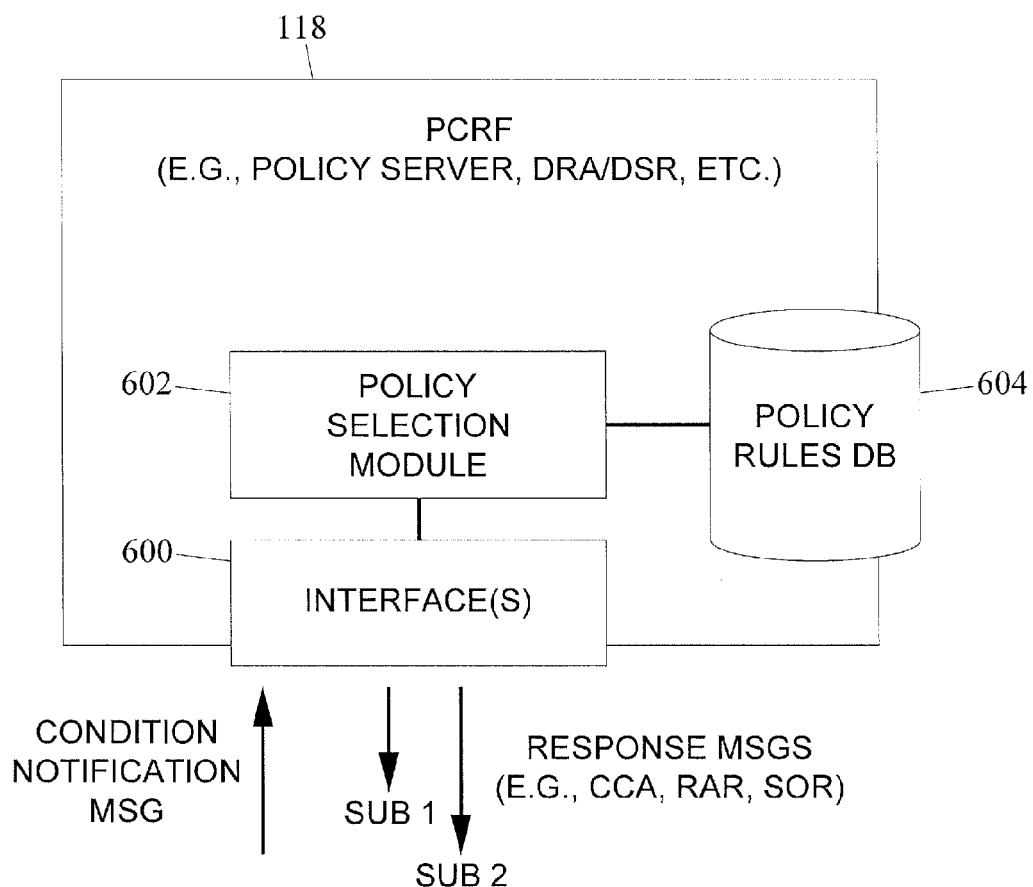
FIG. 6 is block diagram illustrating an exemplary policy and charging rules function (PCRF) node according to an embodiment of the subject matter described herein.

FIG. 6 is block diagram illustrating an exemplary PCRF 118 according to an embodiment of the subject matter described herein. For example, PCRF 118 may be a stand-alone node, such as a policy server. In another embodiment, PCRF 118 may be DRA/DSR 106 with PCRF functionality. For example, a DRA/DSR 106 may include a policy selection module.

Referring to FIG. 6, PCRF 118 includes one or more communications interfaces 600 for sending policy information. For example, after determining or selecting appropriate policy information, a CCA message may be generated that includes policy information. The CCA message may be sent towards a PCEF 116 over any suitable interface, such as the Gx or the Gxx interfaces. In one embodiment, one or more interfaces 600 may be for receiving messages including subscriber related information, such UE-related location information. For example, notify messages from SPR 112 may arrive over the Sp interface or notify messages from PCEF 116 may arrive via the Gx interface. PCRF 118 may also include a policy selection module 702 that determines whether one or more subscribers are associated with an event and may also determine, based on the condition notification, policy information for one or more of the associated subscribers. For example, PCRF 118 may use location information for a first and second subscriber in determining whether the subscribers are associated with a condition notification. In some embodiments, PCRF 118 may store or obtain relevant information for making such determinations.

PCRF 118 may store relevant information in a policy rules database 604. In one embodiment, database 604 may store rules for affecting traffic or network access based on various conditions. In one embodiment, database 604 may also store condition information, e.g., congestion events and other conditions.

PCRF 118 may use stored condition information for determining policy information. For example, PCRF 118 may refuse or block new IP CAN sessions associated with a network based on stored network congestion information. In another example, PCRF 118 may use condition information for determining when policy information for one or more subscribers should revert to pre-condition state, e.g., after a cell load has reached a normal congestion level.

In yet another embodiment, database 604 may store subscriber related information, such as location information. As stated above, location information may be used to determine whether subscribers are associated with a condition notification. For example, if a condition notification is related to a particular cell being congested and a first subscriber and a second subscriber are connected via the congested cell as indicated by information in database 604, PCRF 118 may identify the first subscriber and the second subscriber as associated with the condition notification.

In one embodiment, database 600 may be integrated or co-located with PCRF 118. In another embodiment, database 600 located at a node distinct from PCRF 118.

Figure 7:
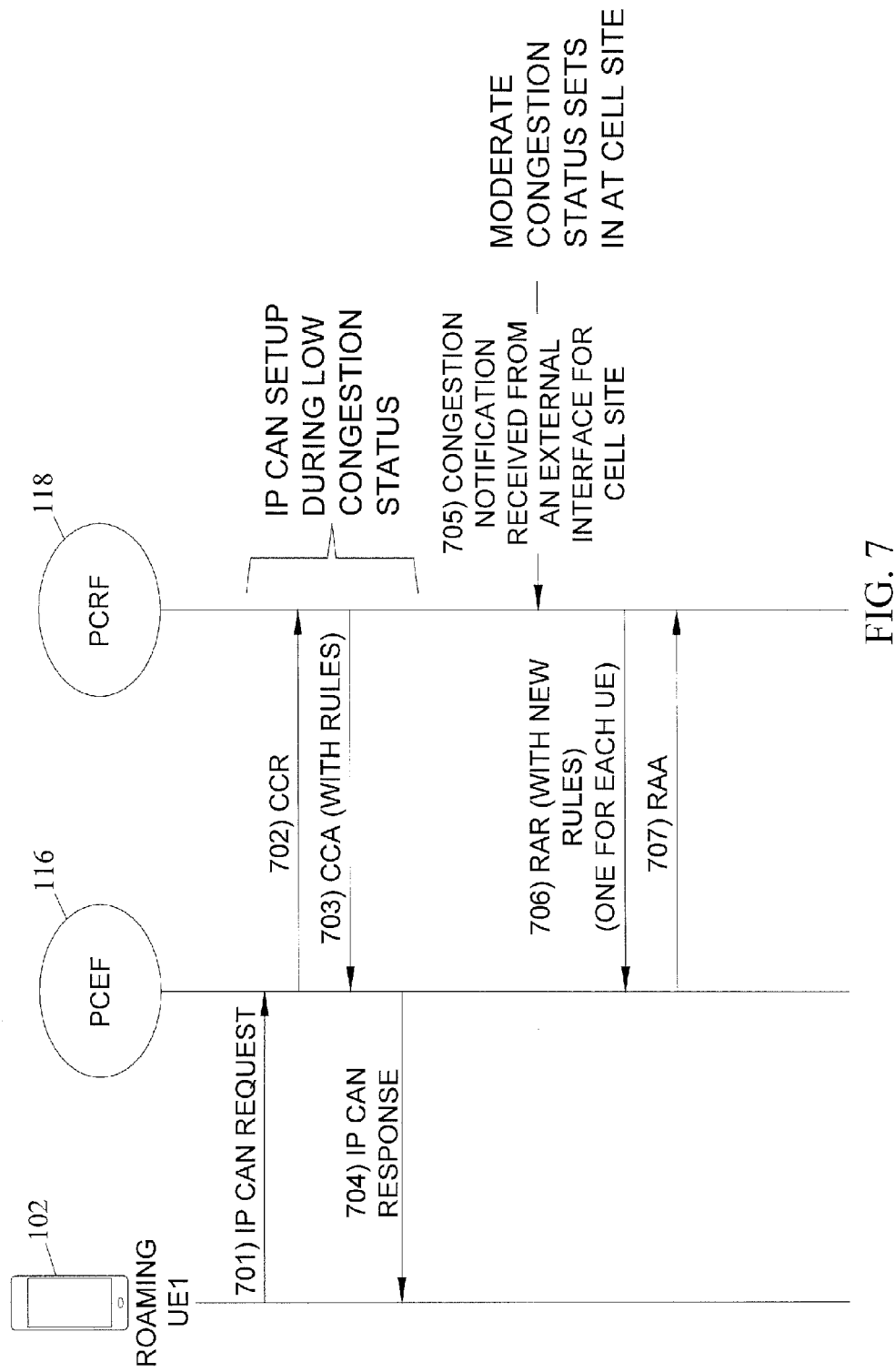
FIG. 7 is a message flow diagram illustrating Internet protocol (IP) connectivity access network (CAN) setup according to an embodiment of the subject matter described herein.

FIG. 7 is a message flow diagram illustrating Internet protocol (IP) connectivity access network (CAN) setup according to an embodiment of the subject matter described herein. In the embodiment shown in FIG. 7, UE 102 communicate with PCEF 116 via an access node (e.g., cell site 's'). For example, UE 102 may be a mobile device connected via a CDMA network and PCEF 116 may be a gateway node (e.g., a PDSN) in the CDMA network.

Referring to FIG. 7, at step 701, an IP CAN session request message may be sent from UE 102 towards PCEF 116. At step 702, in response to receiving the IP CAN request message, a CCR message may be sent from PCEF 116 towards a PCRF 118. The CCR message may include subscriber related information. PCRF 118 may receive the CCR message and may determine whether the IP CAN session is to be allowed. PCRF 118 may also determine an appropriate policy or rules for UE 102. PCRF 118 may perform such determination using various information, e.g., information received in the CCR message and stored information (e.g., at a subscriber database, such as HSS/AAA 110 and/or SPR 112).

At step 703, after determining appropriate policy information, a CCA message including policy information may be sent from PCRF 118 towards PCEF 116. PCEF 116 may receive the CCA message. PCEF 116 may use the policy information in the CCA message to determine whether to allow the IP CAN session request. The policy information may also include rules for handling traffic associated with the subscriber. At step 704, in response to receiving the CCA message, an IP CAN session response message may be sent from PCEF 116 towards UE 102. For example, the IP CAN session response message may include PDP context information indicating that the IP CAN session is activated or allowed.

At step 705, a congestion notification may be sent from one or more nodes in network 100 towards PCRF 118. For example, a transceiver node 104 or a monitoring node 130 may send a congestion notification via an external interface. The congestion notification may be associated with an access node or area (e.g., cell site 's') used by one or more subscribers. PCRF 118 may use the notification and/or other relevant information (e.g., location information) to determine associated subscribers and/or sessions. After determining associated subscribers and/or sessions, PCRF 118 may determine appropriate policy information.

In one embodiment, PCRF 118 may store congestion information. For example, PCRF 118 may maintain state for one or more nodes (e.g., RAN cell sites) in network 100. In this example, in response to receiving congestion information (e.g., metrics from a SNMP-based NMS), PCRF 118 may mark or otherwise indicate, e.g., in an accessible data structure, that a cell site has a congested status. In response to receiving an indication that the cell site is no longer congested, PCRF 118 may clear the congested status. In an embodiment where PCRF 118 maintains state internally, congestion notification may be internal. That is, PCRF 118 may receive a condition notification from itself, or a component therein.

In another embodiment, a subscriber database distinct from PCRF 118 may include state or status information for nodes (e.g., cell sites) in network 100. In this embodiment, the state information may be maintained such that PCRF 118 or other node can identify whether a node is congested without receiving a direct notification. For example, PCRF 118 may request congestion state of a particular node from the subscriber database.

In one embodiment, PCRF 118 may determine policy information for none, some, or all of the associated subscribers and/or sessions. For example, PCRF 118 may determine rules for throttling particular sessions, e.g., resource intensive sessions or sessions associated with particular devices. In another example, PCRF 118 may determine rules for throttling subscribers who have exceeded a certain threshold in data usage. In yet another example, PCRF 118 may determine rules for throttling traffic for a fixed or preconfigured time period.

In one embodiment, after receiving an indicating that a condition is no longer met (e.g., a cell site is no longer congested), PCRF 118 may determine and provide policy information for reverting to a pre-condition state, e.g., rules for un-throttling traffic.

At step 706, in response to determining appropriate policy information, a RAR message including new rules may be sent from PCRF 118 to PCEF 116. For example, PCRF 118 may send, for each associated subscriber, a message including policy information for the associated subscriber to a PCEF 116 serving the associated subscriber. In another example, PCRF 118 may send a message including policy information for various associated subscribers towards a PCEF 116 serving the associated subscribers.

At step 707, a Re-Authorization Answer (RAA) may be sent from PCEF 116 towards PCRF 118. The RAA message may be for acknowledging that PCEF 116 received the RAR message of step 706.

Figure 8:
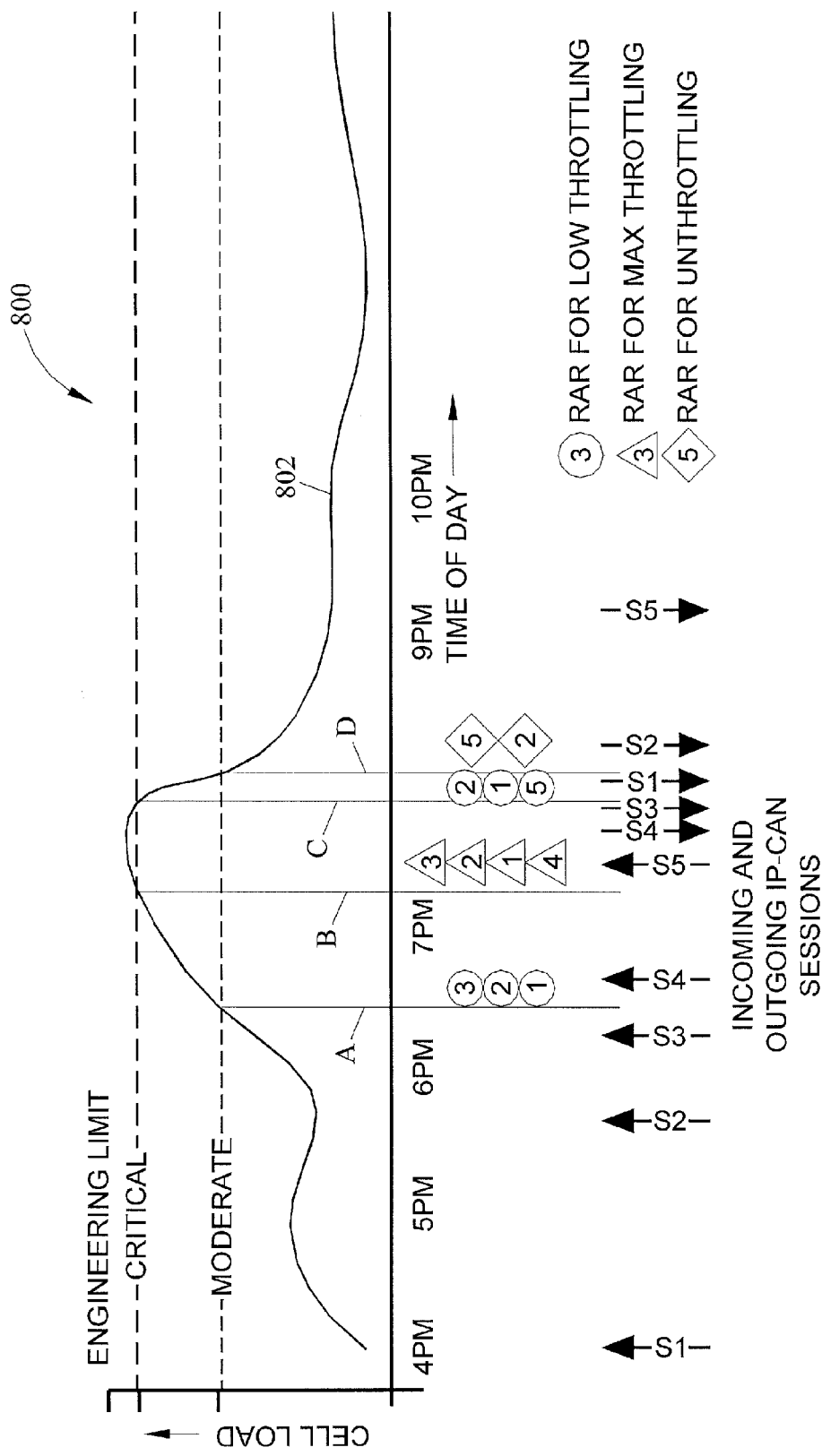
FIG. 8 is a diagram illustrating traffic throttling and cell load according to an embodiment of subject matter described herein.

FIG. 8 is a diagram illustrating traffic throttling and cell load according to an embodiment of subject matter described herein. Referring to FIG. 8, diagram 800 includes a line representing cell load 802 over a period of time. Cell load 802 may represent any suitable means for indicating resource usage of an access node, e.g., rate transfer or other metrics associated with a transceiver node 104, cell site, or base station. As shown in FIG. 8, cell load 802 may vary between a minimum value (e.g., zero or no resource usage) and a maximum value (e.g., an engineering limit).

Diagram 800 also includes two dotted horizontal lines, each indicating a different level of cell load or congestion level. In particular, diagram 800 includes a dotted line labeled "MODERATE" for indicating a moderate congestion level and a dotted line labeled "CRITICAL" for indicating a high congestion level. Diagram 800 further includes various arrows labeled "S1-S5" representing incoming and outgoing IP CAN sessions. IP CAN sessions may represent various communications that affect cell load 802. Diagram 800 also includes various numbered shapes representing RAR messages used to trigger traffic throttling. For example, as shown in FIG. 8, circles, triangles, and rectangles represent RAR messages that include rules for low throttling of traffic, high throttling of traffic, and un-throttling of traffic.

Referring to FIG. 8, various points in times are represented by vertical lines and are labeled "A-D". At point in time A, cell load 802 may be at a moderate congestion level. In response to this moderate congestion level, a PCRF 118 may be notify and may provide throttling rules to one or more subscribers. In one embodiment, PCRF 118 may use congestion level for determining and providing policy information for any current session or new sessions that use the same resources. For example, as indicated in FIG. 8 at line A, rules may be provided for moderate throttling of traffic.

In one embodiment, admission control of new sessions may be based on a congestion notification and/or other information. For example, if a cell site is identified as congested and location information associated with the new session matches that of the congested cell site, PCRF 118 may provide rules to throttle or may deny the new session. In another example, admission control for sessions may be based on thresholds, e.g., a number of active sessions associated with a given subscriber or devices, usage, time of day, bandwidth consumed, and other factors. For example, if location information associated with the new session matches that of the congested cell site, the number of active session for a subscriber may be determined and if the threshold has been reached, the new session may be denied.

At point in time B, cell load 802 may have reached a high congestion level. In response to this high congestion level, a PCRF 118 may be notify and may provide throttling rules to one or more subscribers. In one embodiment, PCRF 118 may use congestion level for determining and providing policy information for any current session or new sessions that use the same resources. For example, as indicated in FIG. 8 at line B, rules may be provided for maximum throttling of traffic.

At point in time C, cell load 802 may have returned to a moderate congestion level. In response to this congestion level, a PCRF 118 may be notify and may provide throttling rules to one or more subscribers. For example, PCRF 118 may determine that maximum traffic throttling for the subscribers is no longer needed and may provide rules accordingly. In one embodiment, PCRF 118 may use congestion level for determining and providing policy information for any current session or new sessions that use the same resources. For example, as indicated in FIG. 8 at line C, rules may be provided for moderate throttling of traffic.

At point in time D, cell load 802 may have returned to a low (e.g., less than moderate) congestion level. In response to this congestion level, a PCRF 118 may be notify and may provide throttling rules to one or more subscribers. For example, PCRF 118 may determine that traffic throttling is no longer needed and may provide rules accordingly. In one embodiment, PCRF 118 may use congestion level for determining and providing policy information for any current session or new sessions that use the same resources. For example, as indicated in FIG. 8 at line D, rules may be provided for unthrottling of traffic.

Figure 9:
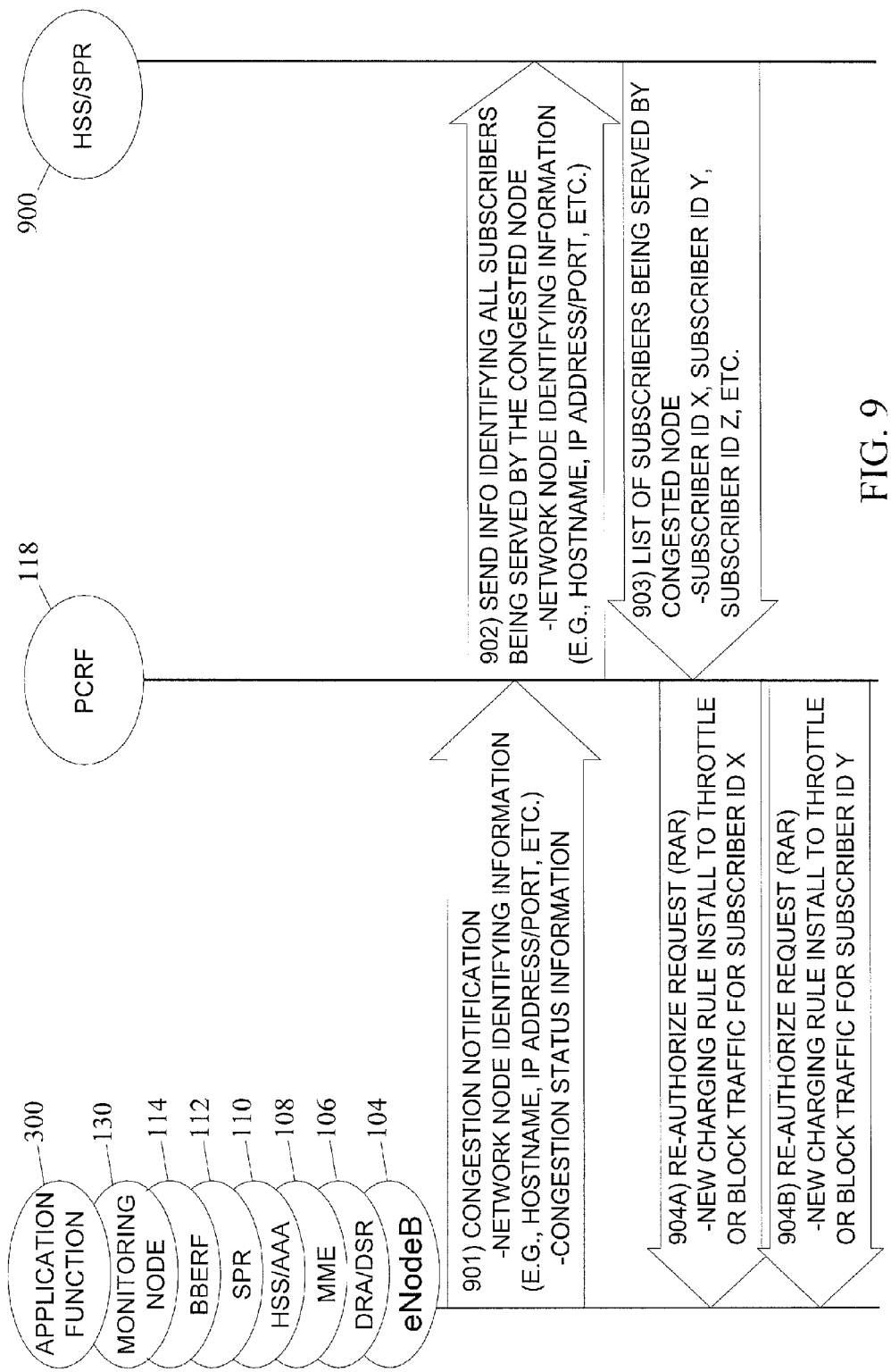
FIG. 9 is message block diagram illustrating providing congestion information to a PCRF according to an embodiment of the subject matter described herein.

FIG. 9 is message block diagram illustrating providing congestion information to a PCRF according to an embodiment of the subject matter described herein. In the embodiment illustrated in FIG. 9, except as disclosed herein, the nodes depicted are essentially the same as described in reference to FIG. 3.

Referring to FIG. 9, at step 901, a notification message including congestion information may be sent towards PCRF 118. For example, PCRF 118 may receive a notify message from one or more nodes in network 100, e.g., application function 300, monitoring node 130, PCEF 116, BBERF 114, SPR 112, HSS/AAA 110, MME 108, DRA/DSR 106, and transceiver node 104.

In one embodiment, a notification message may include network node identifying (NNI) information for identifying a node related to the condition. For example, NNI information may include at least one of a hostname, an IP address, a port number, universal resource identifier (URI), and other identifying information.

In one embodiment, a notification message may include congestion status information. Status information may be for indicating the state of congestion, e.g., various levels of congestion.

After receiving the notification, PCRF may determine subscribers that are associated with the condition. At step 902, a subscriber request may be sent from PCRF 118 towards a subscriber database. The subscriber request may include information for identifying associated subscribers, such as NNI information.

In one embodiment, a subscriber database may be integrated or co-located with PCRF 118. In another embodiment, subscriber database may be a distinct node. In the embodiment shown in FIG. 9, subscriber database 900 may be an HSS and/or SPR (hereinafter referred to HSS/SPR 900). Subscriber database 900 may include information about subscribers, including which nodes are currently serving each subscriber.

In one embodiment, subscriber database 900 or PRCF 118 may use subscriber related information in determining associated subscribers. For example, subscriber database 900 or another node may receive UE-related location information, such as an access node identifier, CGI or BSID, along with session and/or subscriber identifying information. Subscriber database 900 or other node may associate the location information and the session and/or subscriber identifying information. Subscriber database 900 or other node may store this association at a database, e.g., subscriber database or database 202. In one embodiment, subscriber database 900 may identify associated subscribers by matching the NNI information from the subscriber request with the stored location information.

At step 903, a subscriber response may be sent from subscriber database 900 towards PCRF 118. The subscriber response may include information for identifying the associated subscribers and/or sessions. PCRF 118 may determine appropriate policy information for one or more associated subscribers and/or sessions identified in the subscriber response.

In one embodiment, PCRF 118 may use various factors for determining appropriate policies for subscribers and/or sessions. In one embodiment, various factors may include at least one of a cell site or access node load, a time of day, a service type, a device type, number of PDP contexts, number of data service flows, types of application in use, service level, and data usage. For example, using one or more of the above factors, PCRF 118 may determine one or more rules for traffic associated with a subscriber at a congested cell site.

In one embodiment, at step 904A, a RAR message may be sent towards a PCEF 116 for a first associated subscriber. The RAR message may include rules for throttling or blocking traffic of the first associated subscriber.

At step 904B, a second RAR message may be sent towards a PCEF 116 for a second associated subscriber. The RAR message may include rules for throttling or blocking traffic of the second associated subscriber.

In an alternative embodiment, at step 904A, a create session request and/or CCR message may be sent from an AF 300 or other network node (e.g., PCEF 116) to PCRF 118. The create session request may be for requesting a new session. PCRF 118 may determine appropriate policy information for the session. For example, policy information may include information for determining whether the session should be allowed and charging rules for related traffic. At step 904B, a CCA message including the policy information may be sent from PCRF 118 towards AF 300 or other node (e.g., PCEF 116).

Figure 10:
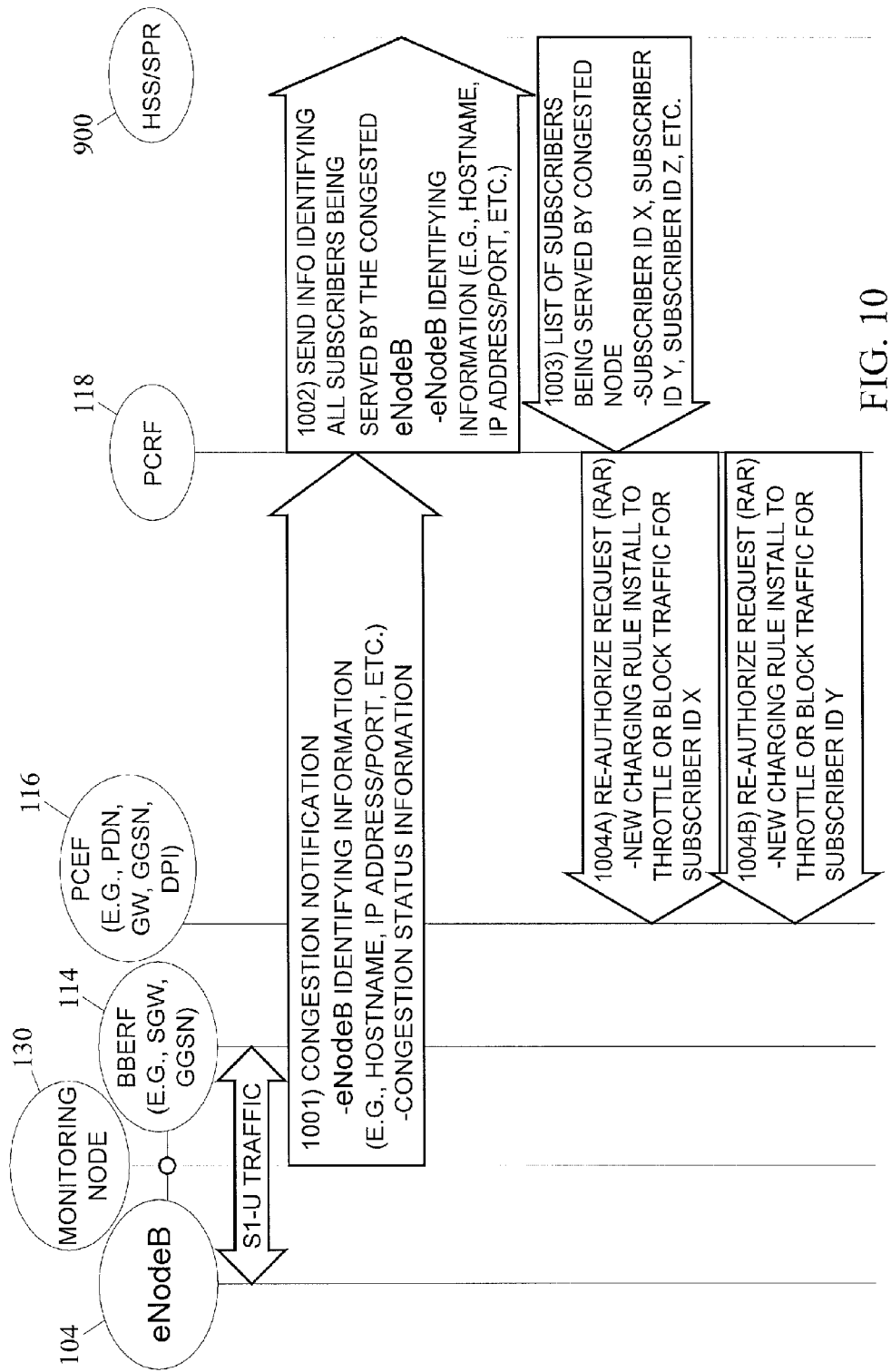
FIG. 10 is message block diagram illustrating providing congestion information to a PCRF from a monitoring node according to an embodiment of the subject matter described herein.

FIG. 10 is message block diagram illustrating providing congestion information to a PCRF from a monitoring node according to an embodiment of the subject matter described herein. In the embodiment illustrated in FIG. 10, except as disclosed herein, the nodes depicted are essentially the same as described in reference to FIG. 3. In this embodiment, monitoring node 130 may monitor traffic between an enode B 104 and BBERF 114, e.g., via the S1-U interface. For example, monitoring node 130 may inspect traffic for indications of congestion. In response to detecting an indication of congestion, monitoring node 130 may notify PCRF 118.

Referring to FIG. 10, at step 1001, a notification message including congestion information may be sent towards PCRF 118 from monitoring node 130.

In one embodiment, a notification message may include network node identifying (NNI) information for identifying enode B or transceiver node 104 related to the condition.

In one embodiment, a notification message may include congestion status information. Status information may be for indicating the state of congestion, e.g., various levels of congestion.

After receiving the notification, PCRF may determine subscribers that are associated with the notification. At step 1002, a subscriber request may be sent from PCRF 118 towards a subscriber database. The subscriber request may include information for identifying associated subscribers, such as NNI information.

In one embodiment, a subscriber database may be integrated or co-located with PCRF 118. In another embodiment, subscriber database may be a distinct node. In the embodiment shown in FIG. 9, the subscriber database may be an HSS and/or SPR (hereinafter referred to HSS/SPR 900). Subscriber database may include information about subscribers, including which nodes are currently serving each subscriber.

At step 1003, a subscriber response may be sent from subscriber database towards PCRF 118. The subscriber response may include information for identifying associated subscribers. Using this information, PCRF 118 may determine appropriate policy information for one or more associated subscribers.

In one embodiment, at step 1004A, a RAR message may be sent towards a PCEF 116 for a first associated subscriber. The RAR message may include rules for throttling or blocking traffic of the associated subscriber.

At step 1004B, a second RAR message may be sent towards a PCEF 116 for a second associated subscriber. The RAR message may include rules for throttling or blocking traffic of the second associated subscriber.

In an alternative embodiment, at step 1004A, a create session request and/or CCR message may be sent from an AF 300 or other network node (e.g., PCEF 116) to PCRF 118. The create session request may be for requesting a new session. PCRF 118 may determine appropriate policy information for the session. For example, policy information may include information for determining whether the session should be allowed and charging rules for related traffic. At step 1004B, a CCA message including the policy information may be sent from PCRF 118 towards AF 300 or other node (e.g., PCEF 116).

Figure 11:
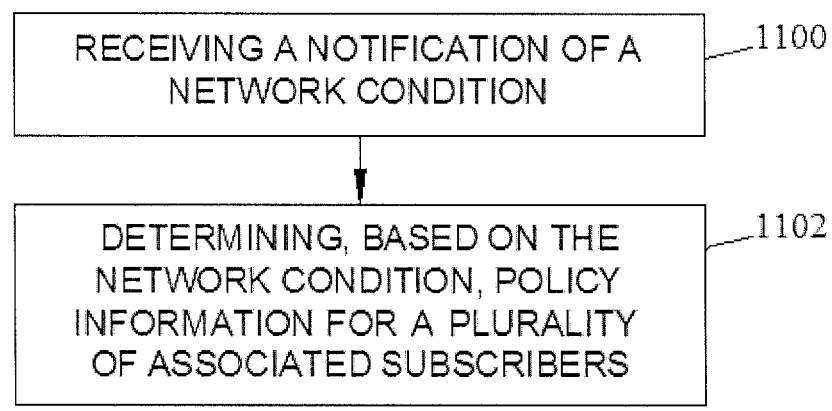
FIG. 11 is a flow chart illustrating exemplary steps for creating condition-triggered policies according to an embodiment of the subject matter described herein.

FIG. 11 is a flow chart illustrating exemplary steps for creating condition-triggered policies according to an embodiment of the subject matter described herein. In one embodiment, one or more exemplary steps described herein may be performed at or performed by PCRF 118. In another embodiment, one or more exemplary steps described herein may be performed at or performed by a policy module located at various nodes in network 100, e.g., DSA/DSR 106 and a policy server.

Referring to FIG. 11, in step 1100, a notification of a network condition may be received. For example, a PCRF 118 may subscribe to congestion related events at one or more nodes in network 100 as illustrated in step 403 of FIG. 4B. In this example, a PCEF 116 may receive a notification of a congestion related event from a subscribed-to entity and may provide notification to PCRF 118. In a second example, a subscribed-to entity may provide notification to PCRF 118.

In one embodiment, at least one of subscriber related information and the condition notification may be sent by at least one of a user device, a universal integrated circuit card (UICC), a subscriber profile repository (SPR), a home subscriber server (HSS), a home location register (HLR), a visitor location register (VLR), an authentication, authorization, and accounting (AAA) server, a policy and charging rules function (PCRF), a PCEF, a mobility management entity (MME), a network operator, a network management node, a radio network controller (RNC), a base station controller (BSC), a transceiver node, a node B, an enode B, a monitoring probe, a monitoring node, a bearer binding and event reporting function (BBERF), a diameter signaling router, a diameter routing agent, a network node, a policy engine, a policy server, a long term evolution (LTE) node, an application function (AF), an Internet protocol (IP) multimedia subsystem (IMS) network node, a radio access network (RAN) node, a core network node, an external network node, a server, a node, a database, and a computing platform.

In one embodiment, the condition notification may indicate one of a cell congestion event, a network congestion event, a node congestion event, a service congestion event, a service interruption event, a network event, a service event, a node event, an access node event, a bandwidth usage event, a usage time event, a time event, a day event, a reset event, a subscriber event, a registration event, a de-registration event, an emergency event, a service level event, a quality of service event, a user device event, an access network, an external network, a core network event, and a tier event.

In one embodiment, it may be determined whether a plurality of subscribers is associated with the network condition. For example, PCRF 118 may access one or more databases to obtain information subscriber related information, condition information, and policy rules. In one embodiment, PCRF 118 may use location information associated with a first subscriber and a second subscriber in determining that the first subscriber and second subscriber are associated with the condition notification.

In step 1102, policy information for one or more of the associated subscribers may be determined based on the network condition. For example, in response to receiving a cell congestion notification, PCRF 118 may determine appropriate policies for all subscribers using the congested cell.

In one embodiment, PCRF 118 (e.g., using a communications interface) may send policy information towards at least one of a user device, a universal integrated circuit card (UICC), a subscriber profile repository (SPR), a home subscriber server (HSS), a home location register (HLR), a visitor location register (VLR), an authentication, authorization, and accounting (AAA) server, a policy and charging rules function (PCRF), a PCEF, a mobility management entity (MME), a network operator, a network management node, a radio network controller (RNC), a base station controller (BSC), a transceiver node, a node B, an enode B, a monitoring probe, a monitoring node, a bearer binding and event reporting function (BBERF), a diameter signaling router, a diameter routing agent, a network node, a policy engine, a policy server, a long term evolution (LTE) node, an application function (AF), an Internet protocol (IP) multimedia subsystem (IMS) network node, a radio access network (RAN) node, a core network node, an external network node, a server, a node, a database, and a computing platform.

In one embodiment, PCRF 118 may send a RAR message to a PCEF 116 serving each associated subscriber. The RAR message may include rules for throttling traffic such that congestion is alleviated. In another instance, PCRF 118 may send a USAT refresh message or SoR message for triggering a UE 102 associated with the subscriber to connect via a less congested network or node.

In one embodiment, policy information may include at least one of information indicating priority among a plurality of access networks, information indicating that a congested network has a lower priority than a non-congested network, information for triggering a user device to end a connection with a congested network, information for triggering a user device to establish a connection with a non-congested network, information for triggering a user device to end a connection with a congested node, information for triggering a user device to establish a connection via a non-congested node, information for throttling traffic associated with a subscriber, information for blocking traffic associated with a subscriber, information for allowing traffic associated with a subscriber, information for affecting traffic, information for affecting a service, information for affecting network access, information for affecting node access, and information for affecting service access.

It will be appreciated that the above examples are illustrative and that the functionality described herein may be implemented for use with or applicable for various protocols and communications networks, without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for determining condition-triggered information, the system comprising:
 a policy and charging rules function (PCRF) node comprising:
  a communications interface; and
  a policy selection module for receiving a notification of a network condition and determining, based on the network condition, policy information for a plurality of associated subscribers, wherein the PCRF node receives an indication of network congestion regarding a first subscriber of the plurality of associated subscribers and wherein the policy selection module selects and communicates, to a plurality of subscriber terminals associated with the plurality of associated subscribers or to a policy and charging enforcement function (PCEF), the policy information for changing policies of the plurality of associated subscribers, wherein the plurality of associated subscribers are in a geographic area and wherein the policies are configured to mitigate congestion in the geographic area, wherein the policy information is for triggering the subscriber terminals to establish connections via a non-congested node,
 wherein the communications interface is configured for sending a steering of roaming (SoR) message including the policy information, a re-authorization request (RAR) message including the policy information, or a credit control answer (CCA) message including the policy information.

2. The system of claim 1 wherein the PCRF node receives an indication of network congestion regarding a network node and wherein the policy selection module selects and communicates to a policy and charging enforcement function (PCEF) the policy information for changing the policies of the plurality of associated subscribers, wherein the plurality of associated subscribers are being served by the network node and wherein the policies are configured to mitigate congestion.

3. The system of claim 1 wherein determining, based on the network condition, the policy information for the plurality of associated subscribers includes identifying subscribers affected by or potentially causing the network condition.

4. The system of claim 1 wherein the communications interface is configured for sending the policy information towards a user device, a universal integrated circuit card (UICC), a subscriber profile repository (SPR), a home subscriber server (HSS), a home location register (HLR), a visitor location register (VLR), an authentication, authorization, and accounting (AAA) server, a policy and charging rules function (PCRF), a policy and charging enforcement function (PCEF), a mobility management entity (MME), a network operator, a network management node, a radio network controller (RNC), a base station controller (BSC), a transceiver node, a node B, an enode B, a monitoring probe, a bearer binding and event reporting function (BBERF), a diameter signaling router, a diameter relay agent, a network node, a policy engine, a policy server, a long term evolution (LTE) node, an application function (AF), an Internet protocol (IP) multimedia subsystem (IMS) network node, a radio access network (RAN) node, a core network node, an external network node, a server, a database, or a computing platform.

5. The system of claim 1 wherein the communication interface is configured for sending, for each associated subscriber, a message including the policy information for the associated subscriber to a policy and charging enforcement function (PCEF) serving the associated subscriber.

6. The system of claim 1 wherein the communication interface is configured for sending a message including the policy information for the plurality of associated subscribers to a policy and charging enforcement function (PCEF) serving the plurality of associated subscribers.

7. The system of claim 1 wherein the policy selection module uses location information associated with a first subscriber in determining that the second subscriber is associated with the condition notification.

8. The system of claim 1 wherein determining, based on the network condition, the policy information for the plurality of associated subscribers includes determining a service level associated with each subscriber and using the associated service levels in determining the policies.

9. The system of claim 1 comprising one or more databases for storing subscriber related information, policy rules, and condition information.

10. The system of claim 1 wherein the PCRF node comprises one of a Diameter signaling router, a Diameter routing agent, a network node, a policy engine, a policy server, an application function (AF), an application server, a Diameter signaling agent, a long term evolution (LTE) node, an Internet protocol (IP) multimedia subsystem (IMS) network node, a server, a node, a database, and a computing platform.

11. The system of claim 1 wherein at least one of subscriber related information or the condition notification is sent by a user device, a universal integrated circuit card (UICC), a subscriber profile repository (SPR), a home subscriber server (HSS), a home location register (HLR), a visitor location register (VLR), an authentication, authorization, and accounting (AAA) server, a policy and charging rules function (PCRF), a policy and charging enforcement function (PCEF), a mobility management entity (MME), a network operator, a network management node, a radio network controller (RNC), a base station controller (BSC), a transceiver node, a node B, an enode B, a monitoring probe, a bearer binding and event reporting function (BBERF), a diameter signaling router, a diameter relay agent, a network node, a policy engine, a policy server, a long term evolution (LTE) node, an application function (AF), an Internet protocol (IP) multimedia subsystem (IMS) network node, a radio access network (RAN) node, a core network node, an external network node, a server, a database, or a computing platform.

12. The system of claim 1 wherein the condition notification indicates one of a cell congestion event, a network congestion event, a node congestion event, a service congestion event, a service interruption event, a network event, a service event, a node event, an access node event, a bandwidth usage event, a usage time event, a time event, a day event, a reset event, a subscriber event, a registration event, a de-registration event, an emergency event, a service level event, a quality of service event, a user device event, an access network, an external network, a core network event, and a tier event.

13. The system of claim 1 wherein the policy information includes information indicating priority among a plurality of access networks, information indicating that a congested network has a lower priority than a non-congested network, information for triggering a user device to end a connection with a congested network, information for triggering a user device to establish a connection with a non-congested network, information for triggering a user device to end a connection with a congested node, information for triggering a user device to establish a connection via a non-congested node, information for throttling traffic associated with a subscriber, information for blocking traffic associated with a subscriber, information for allowing traffic associated with a subscriber, information for affecting traffic, information for affecting a service, information for affecting network access, information for affecting node access, or information for affecting service access.

14. A method for determining condition-triggered information, the method comprising:
at a policy and charging rules function (PCRF) node:
receiving a notification of a network condition;
determining, based on the network condition, policy information for a plurality of associated subscribers, wherein the PCRF node receives an indication of network congestion regarding a first subscriber of the plurality of associated subscribers and wherein the policy information is communicated, to a plurality of subscriber terminals associated with the plurality of associated subscribers or to a policy and charging enforcement function (PCEF), for changing policies of the plurality of associated subscribers, wherein the plurality of associated subscribers are in a geographic area and wherein the policies are configured to mitigate congestion in the geographic area, wherein the policy information is communicated for triggering the subscriber terminals to establish connections via a non-congested node; and
sending the policy information, wherein sending the policy information includes sending a steering of roaming (SoR) message including the policy information, a re-authorization request (RAR) message including the policy information, or a credit control answer (CCA) message including the policy information.

15. The method of claim 14 wherein the PCRF node receives an indication of network congestion regarding a network node and wherein the policy information is communicated to a policy and charging enforcement function (PCEF) for changing the policies of the plurality of associated subscribers, wherein the plurality of associated subscribers are being served by the network node and wherein the policies are configured to mitigate congestion.

16. The method of claim 14 wherein determining, based on the network condition, the policy information for the plurality of associated subscribers includes identifying subscribers affected by or potentially causing the network condition.

17. The method of claim 14 wherein sending the policy information towards a user device, a universal integrated circuit card (UICC), a subscriber profile repository (SPR), a home subscriber server (HSS), a home location register (HLR), a visitor location register (VLR), an authentication, authorization, and accounting (AAA) server, a policy and charging rules function (PCRF), a policy and charging enforcement function (PCEF), a mobility management entity (MME), a network operator, a network management node, a radio network controller (RNC), a base station controller (BSC), a transceiver node, a node B, an enode B, a monitoring probe, a bearer binding and event reporting function (BBERF), a diameter signaling router, a diameter relay agent, a network node, a policy engine, a policy server, a long term evolution (LTE) node, an application function (AF), an Internet protocol (IP) multimedia subsystem (IMS) network node, a radio access network (RAN) node, a core network node, an external network node, a server, a database, or a computing platform.

18. The method of claim 14 wherein sending the policy information includes sending, for each associated subscriber, a message including policy information for the associated subscriber to a policy and charging enforcement function (PCEF) serving the associated subscriber.

19. The method of claim 14 wherein sending the policy information includes sending a message including the policy information for the plurality of associated subscribers to a policy and charging enforcement function (PCEF) serving the plurality of associated subscribers.

20. The method of claim 14 wherein determining, based on the network condition, the policy information for the plurality of associated subscribers includes using location information for determining that the first subscriber and the second subscriber are associated with the condition notification.

21. The method of claim 14 wherein determining, based on the network condition, the policy information for the plurality of associated subscribers includes determining a service level associated with each subscriber and using the associated service levels in determining-policies.

22. The method of claim 14 wherein at least one of subscriber related information, policy rules, and condition information is stored at and received from a database.

23. The method of claim 14 wherein the PCRF node comprises a Diameter signaling router, a Diameter routing agent, a network node, a policy engine, a policy server, an application function (AF), an application server, a Diameter signaling agent, a long term evolution (LTE) node, an Internet protocol (IP) multimedia subsystem (IMS) network node, a server, a node, a database, or a computing platform.

24. The method of claim 14 wherein subscriber related information or the condition notification is sent by a user device, a universal integrated circuit card (UICC), a subscriber profile repository (SPR), a home subscriber server (HSS), a home location register (HLR), a visitor location register (VLR), an authentication, authorization, and accounting (AAA) server, a policy and charging rules function (PCRF), a policy and charging enforcement function (PCEF), a mobility management entity (MME), a network operator, a network management node, a radio network controller (RNC), a base station controller (BSC), a transceiver node, a node B, an enode B, a monitoring probe, a bearer binding and event reporting function (BBERF), a diameter signaling router, a diameter relay agent, a network node, a policy engine, a policy server, a long term evolution (LTE) node, an application function (AF), an Internet protocol (IP) multimedia subsystem (IMS) network node, a radio access network (RAN) node, a core network node, an external network node, a server, a database, or a computing platform.

25. The method of claim 14 wherein the condition notification indicates one of a cell congestion event, a network congestion event, a node congestion event, a service congestion event, a service interruption event, a network event, a service event, a node event, an access node event, a bandwidth usage event, a usage time event, a time event, a day event, a reset event, a subscriber event, a registration event, a de-registration event, an emergency event, a service level event, a quality of service event, a user device event, an access network event, an external network event, a core network event, and a tier event.

26. The method of claim 14 wherein the policy information includes information indicating priority among a plurality of access networks, information indicating that a congested network has a lower priority than a non-congested network, information for triggering a user device to end a connection with a congested network, information for triggering a user device to establish a connection with a non-congested network, information for triggering a user device to end a connection with a congested node, information for triggering a user device to establish a connection via a non-congested node, information for throttling traffic associated with a subscriber, information for blocking traffic associated with a subscriber, information for allowing traffic associated with a subscriber, information for affecting traffic, information for affecting a service, information for affecting network access, information for affecting node access, or information for affecting service access.

27. A non-transitory computer readable medium having stored thereon executable instructions that when executed by a processor of a computer control the computer to perform steps comprising:
at a policy and charging rules function (PCRF) node:
receiving a notification of a network condition;
determining, based on the network condition, policy information for a plurality of associated subscribers, wherein the PCRF node receives an indication of network congestion regarding a first subscriber of the plurality of associated subscribers and wherein the policy information is communicated, to a plurality of subscriber terminals associated with the plurality of associated subscribers or to a policy and charging enforcement function (PCEF), for changing policies of the plurality of associated subscribers, wherein the plurality of associated subscribers are in a geographic area and wherein the policies are configured to mitigate congestion in the geographic area, wherein the policy information is communicated for triggering the subscriber terminals to establish connections via a non-congested node; and
sending the policy information, wherein sending the policy information includes sending a steering of roaming (SoR) message including the policy information, a re-authorization request (RAR) message including the policy information, or a credit control answer (CCA) message including the policy information.

* * * * *